United States Patent
Takahashi et al.

(10) Patent No.: US 7,102,786 B2
(45) Date of Patent: Sep. 5, 2006

(54) IMAGE READING APPARATUS AND PROCESSING APPARATUS

(75) Inventors: Naoki Takahashi, Kyoto-fu (JP); Kazuyuki Murata, Kyoto-fu (JP); Hideyuki Kuwano, Osaka-fu (JP); Takashi Nakanishi, Hyogo-ken (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 868 days.

(21) Appl. No.: 09/970,084

(22) Filed: Oct. 4, 2001

(65) Prior Publication Data

US 2002/0041406 A1    Apr. 11, 2002

(30) Foreign Application Priority Data

Oct. 5, 2000   (JP) .............................. 2000-305859
Dec. 19, 2000  (JP) .............................. 2000-385902

(51) Int. Cl.
  *G03F 3/08*   (2006.01)
  *G06K 9/48*   (2006.01)
  *G06K 9/34*   (2006.01)
  *G03G 15/04*  (2006.01)

(52) U.S. Cl. .................... 358/1.9; 382/199; 382/176; 382/175; 399/189

(58) Field of Classification Search ................. 358/1.9; 382/199, 202–203, 176, 462, 464, 449, 266–269, 382/175; 250/559.2; 399/189
See application file for complete search history.

(56) References Cited

U.S. PATENT DOCUMENTS 4,870,457 A * 9/1989 Migita et al. ............... 399/189
4,929,844 A * 5/1990 Houjiyou et al. ......... 250/559.2
5,068,913 A * 11/1991 Sugiura ...................... 382/175

FOREIGN PATENT DOCUMENTS

JP      07-023224      1/1995

* cited by examiner

*Primary Examiner*—Kimberly Williams
*Assistant Examiner*—Charlotte M. Baker
(74) *Attorney, Agent, or Firm*—McDermott Will & Emery LLP

(57) ABSTRACT

In a sky shot, when a closing and opening detection unit detects the opening of a document cover, contour detecting means detects as a probable edge point a pixel thought to be a document edge point, a contour correction unit determines whether the probable edge point is a document edge or not, and an image forming unit forms image data of a document on the basis of the document edge point.

24 Claims, 19 Drawing Sheets

[FIG.1]
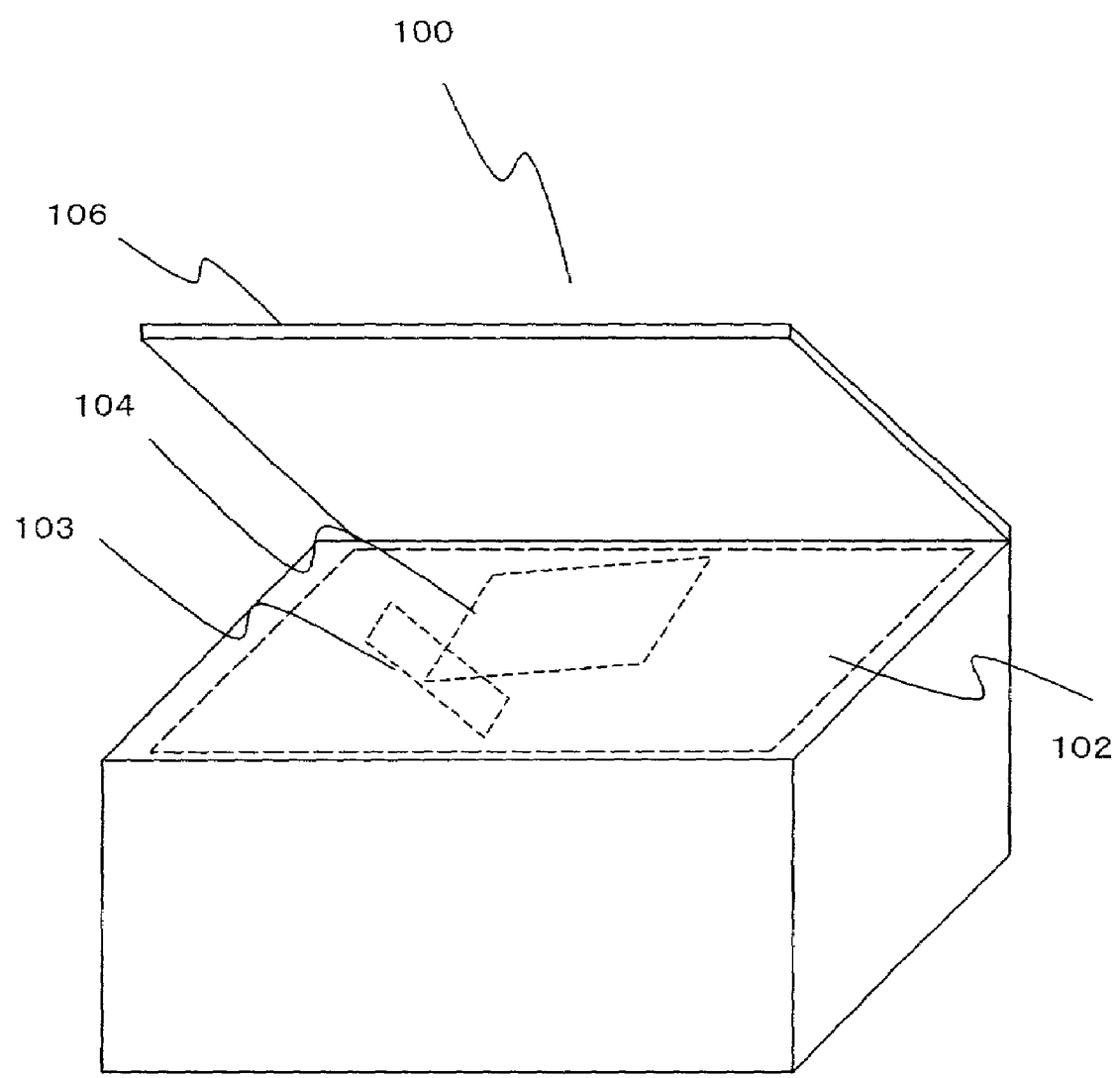

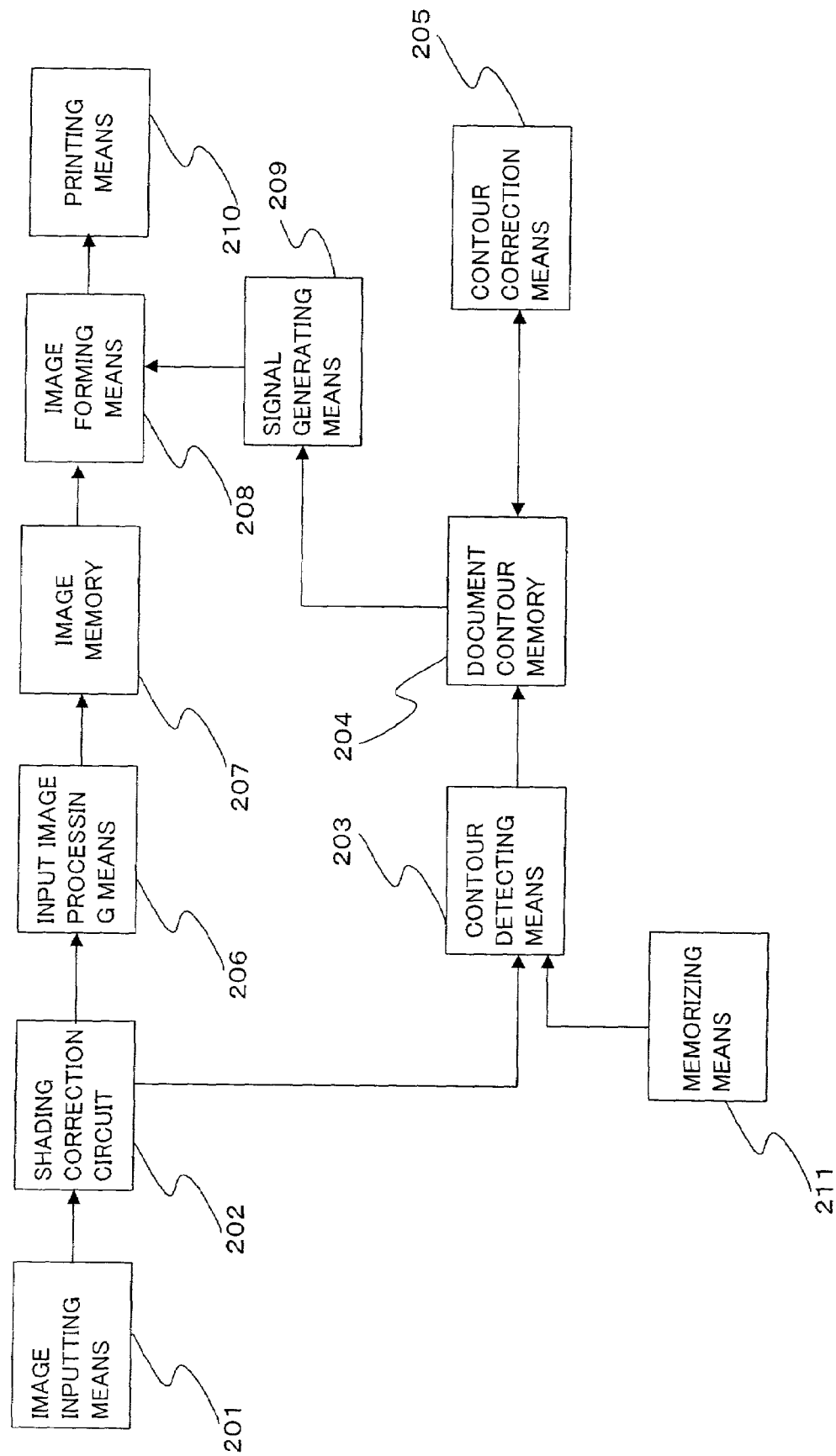
[FIG. 2]

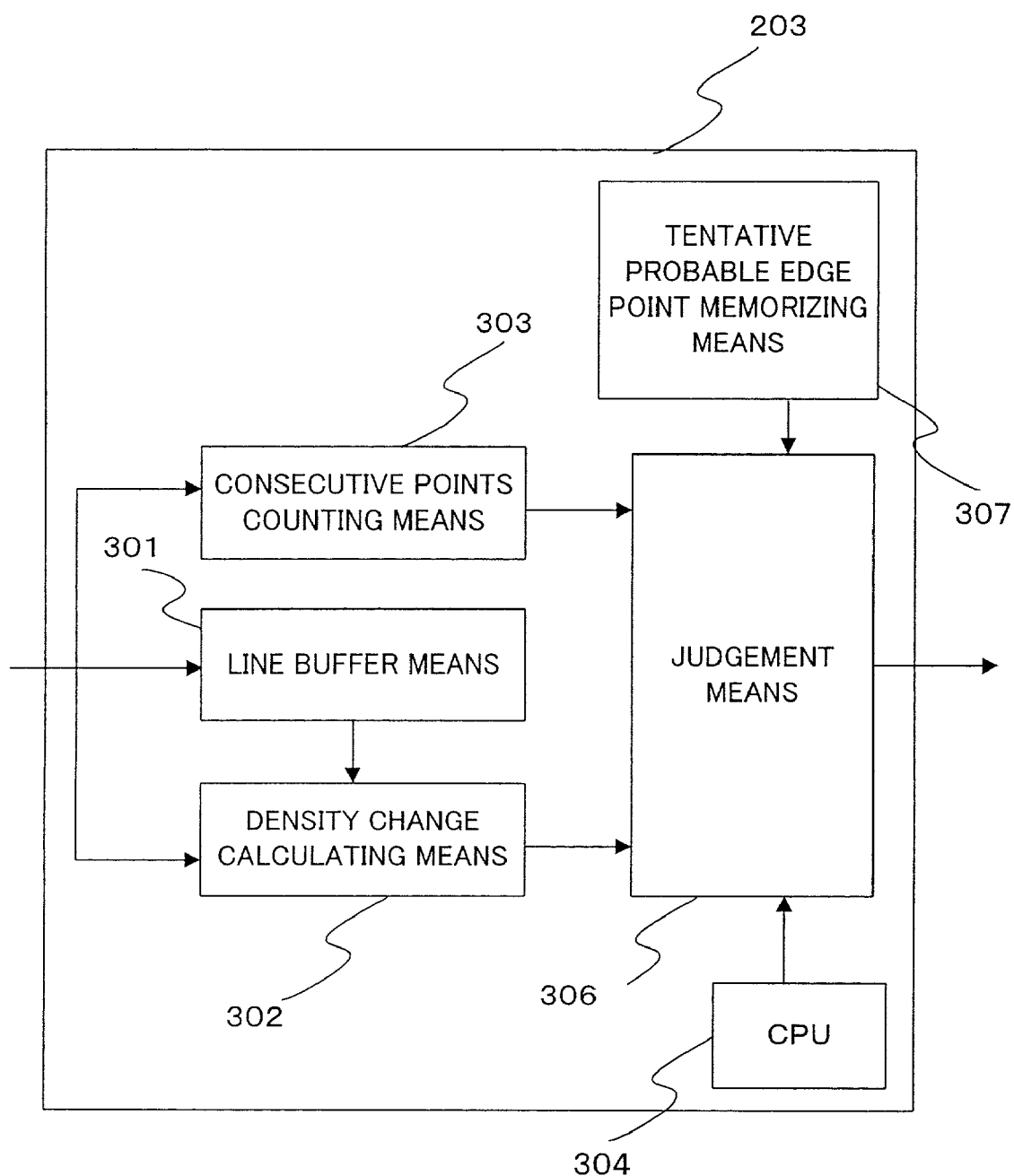
[FIG. 3]

|  -1 | -2 | -1 |
| --- | --- | --- |
|  0  |  0 |  0 |
|  1  |  2 |  1 |

(b)

| -1 | 0 | 1 |
| --- | --- | --- |
| -2 | 0 | 2 |
| -1 | 0 | 1 |

[FIG. 5]
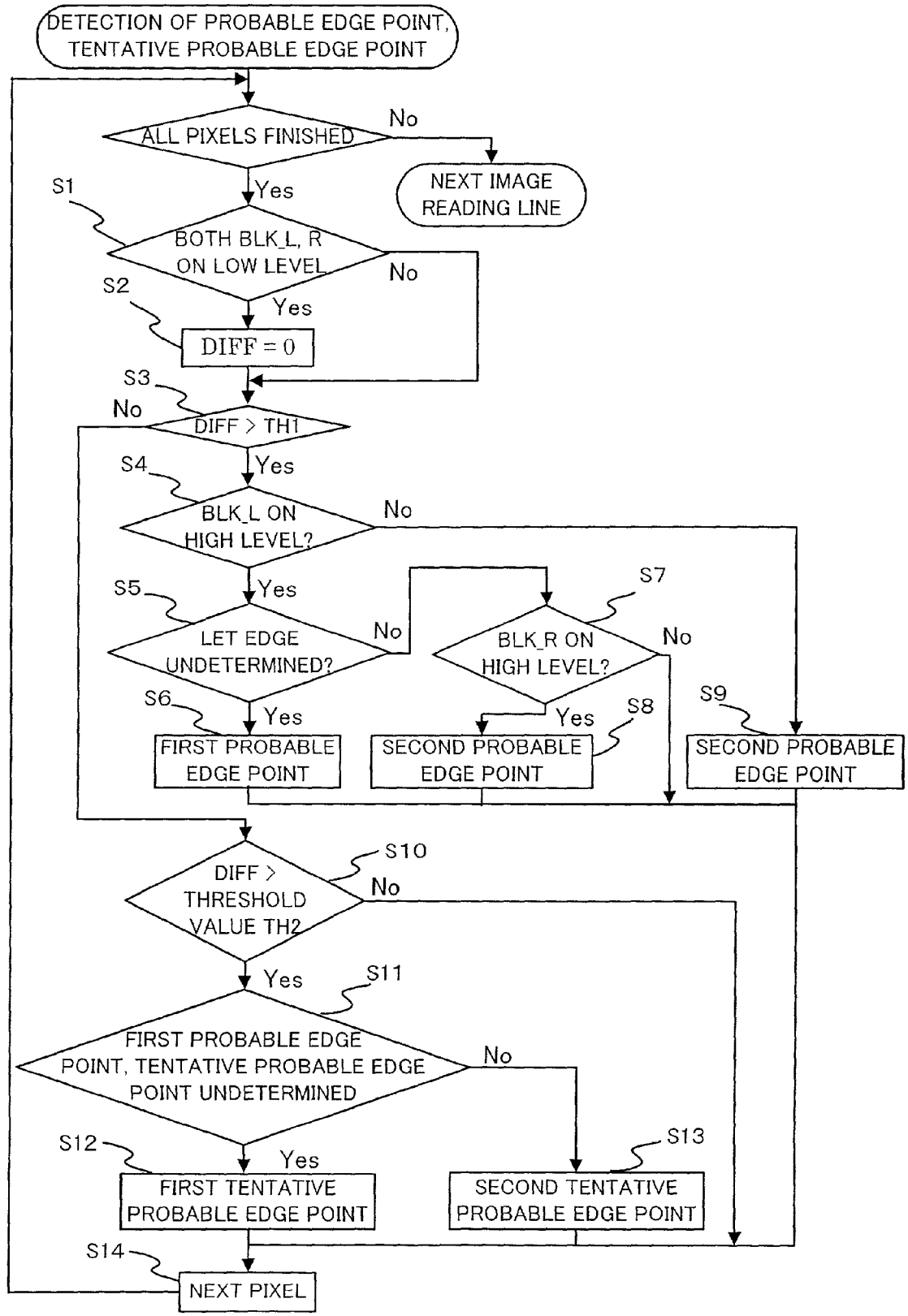

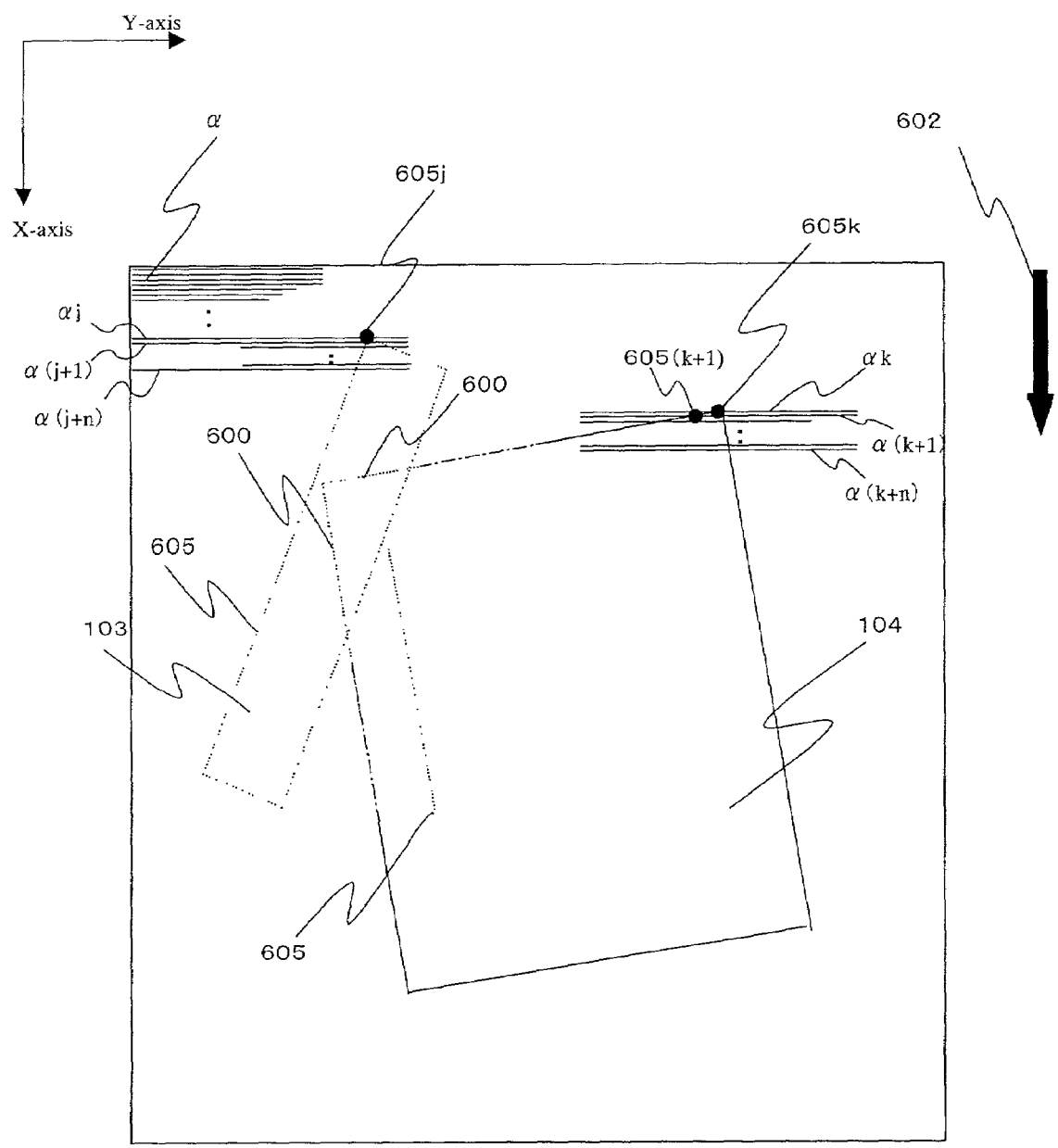
[FIG.6]

[FIG. 7]
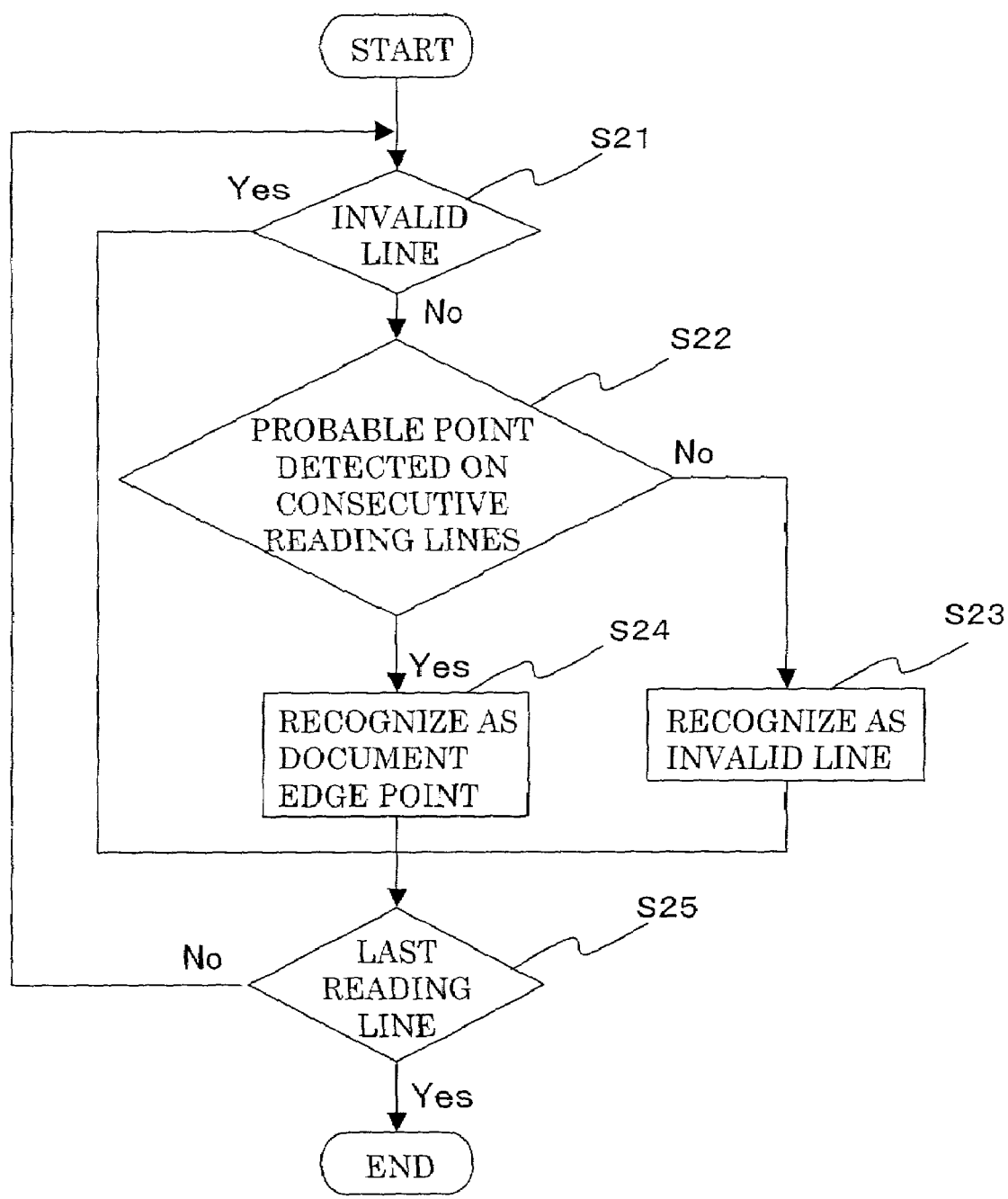

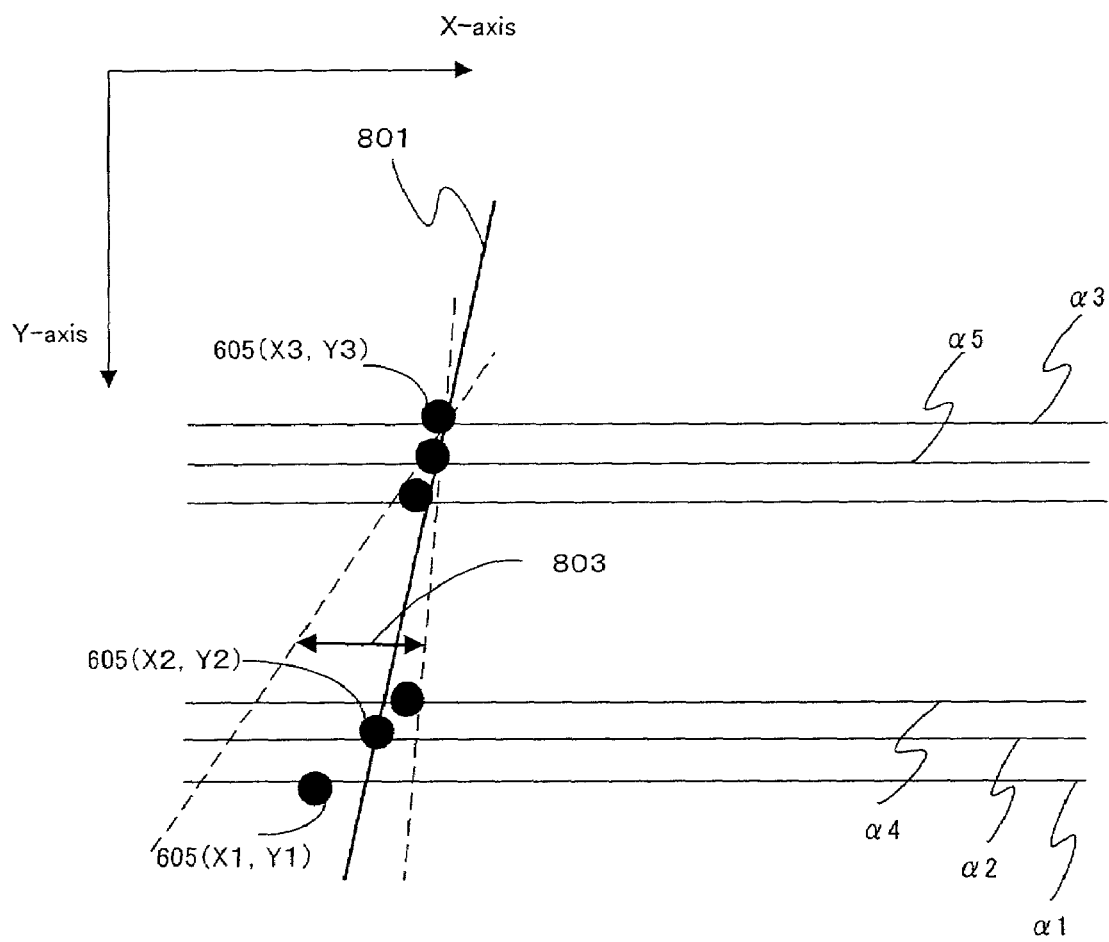

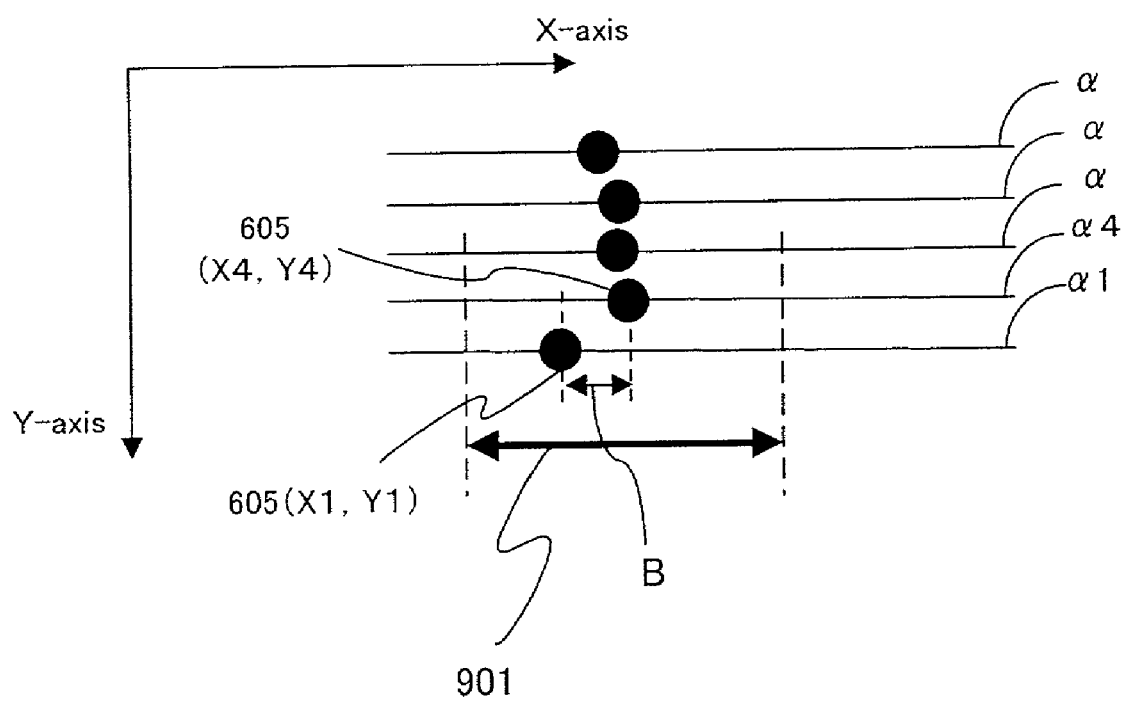
[FIG. 9]

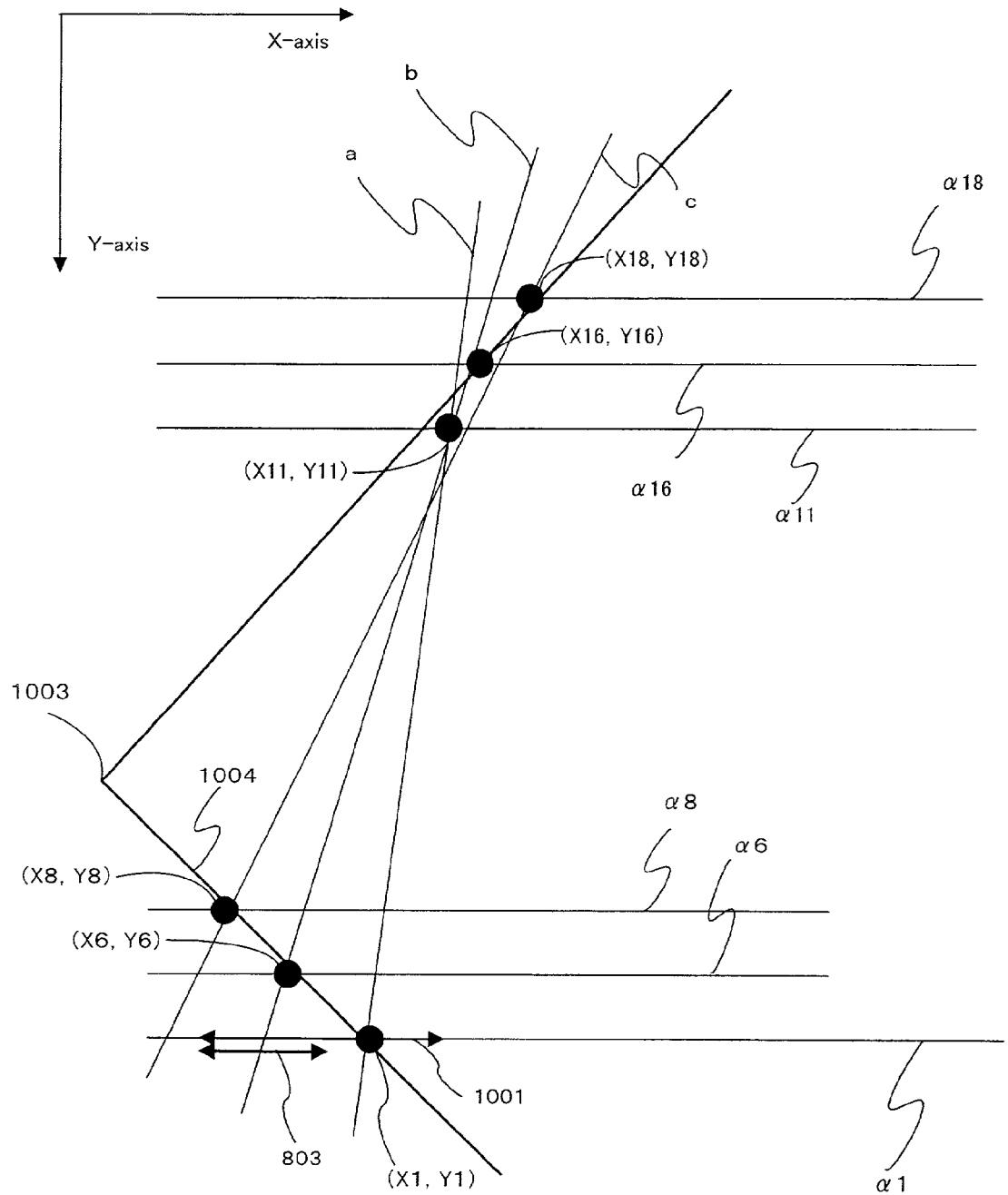
[FIG. 10]

[FIG. 11]
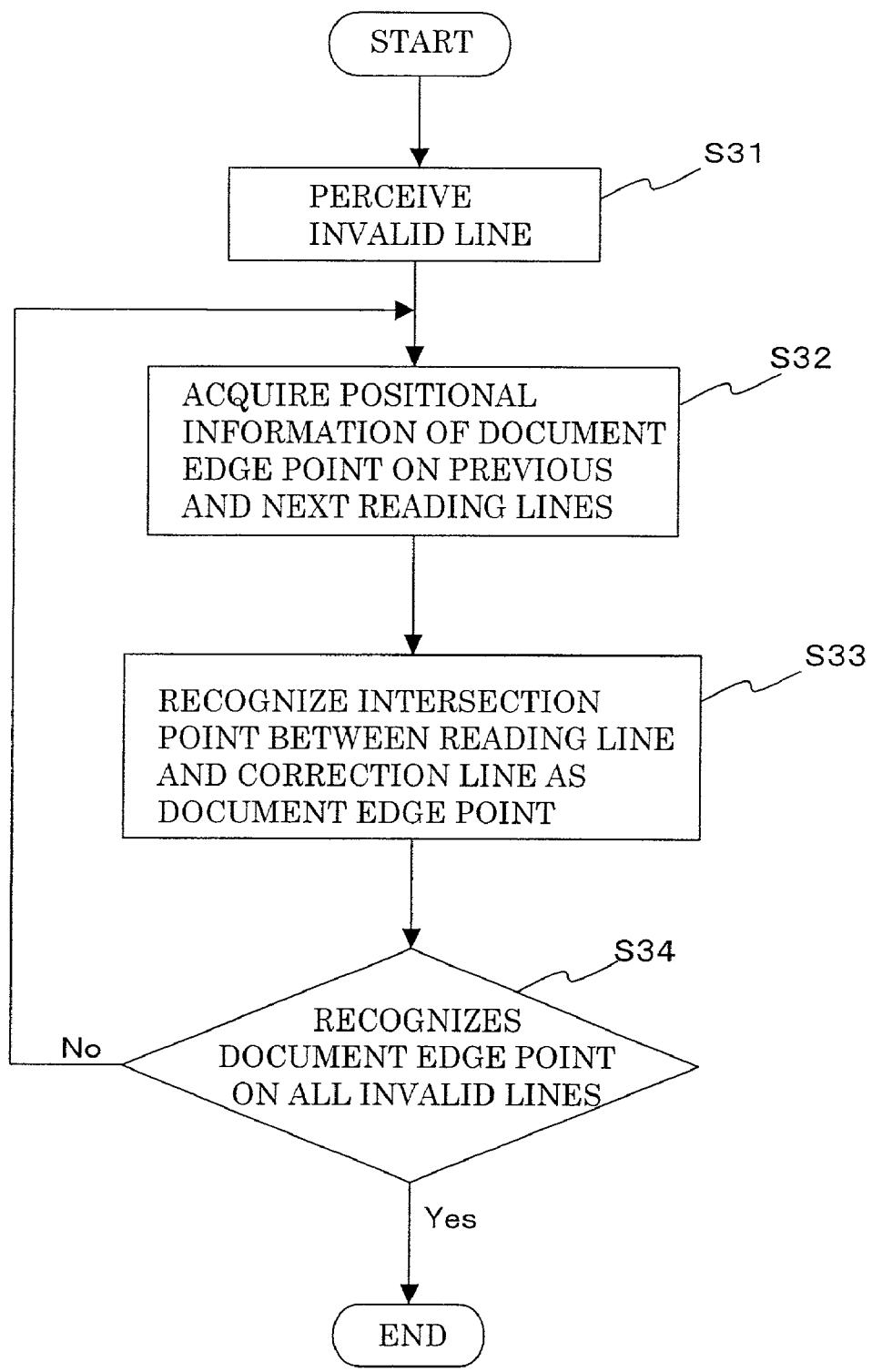

[FIG. 12]
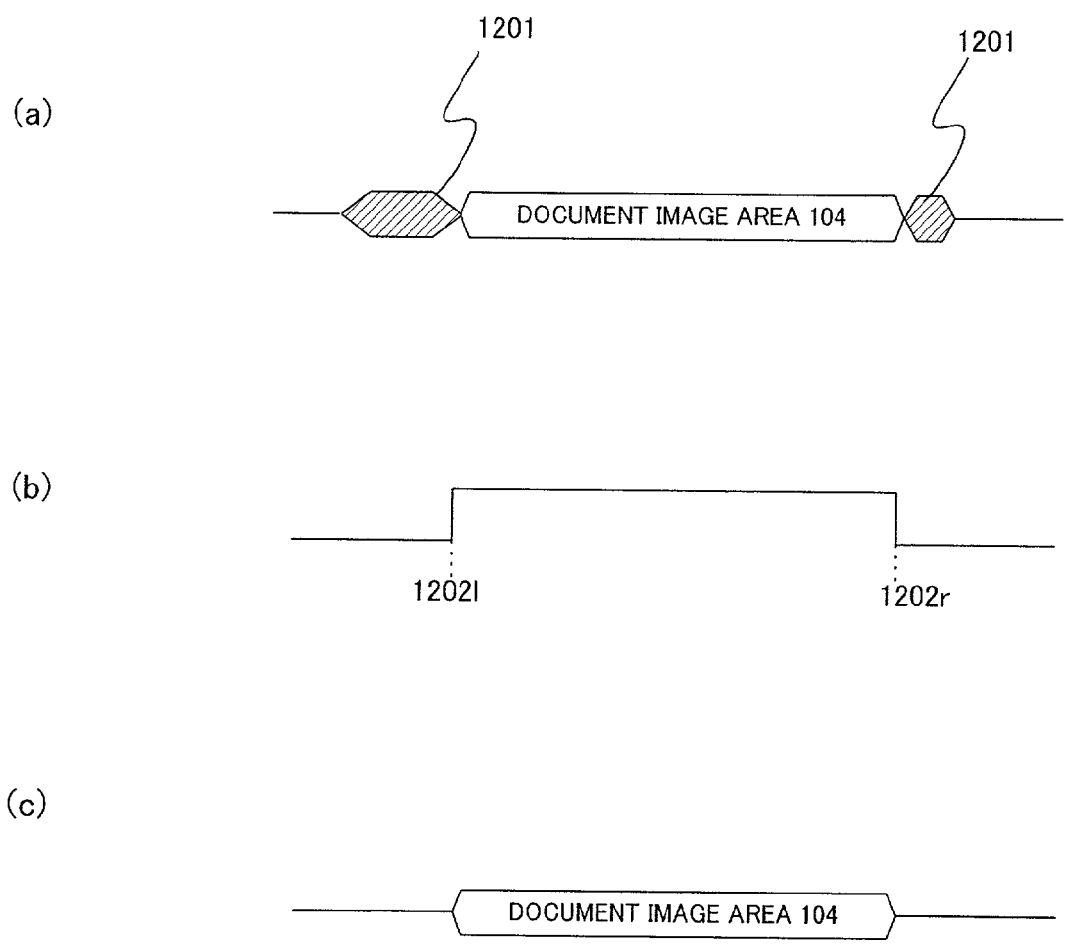

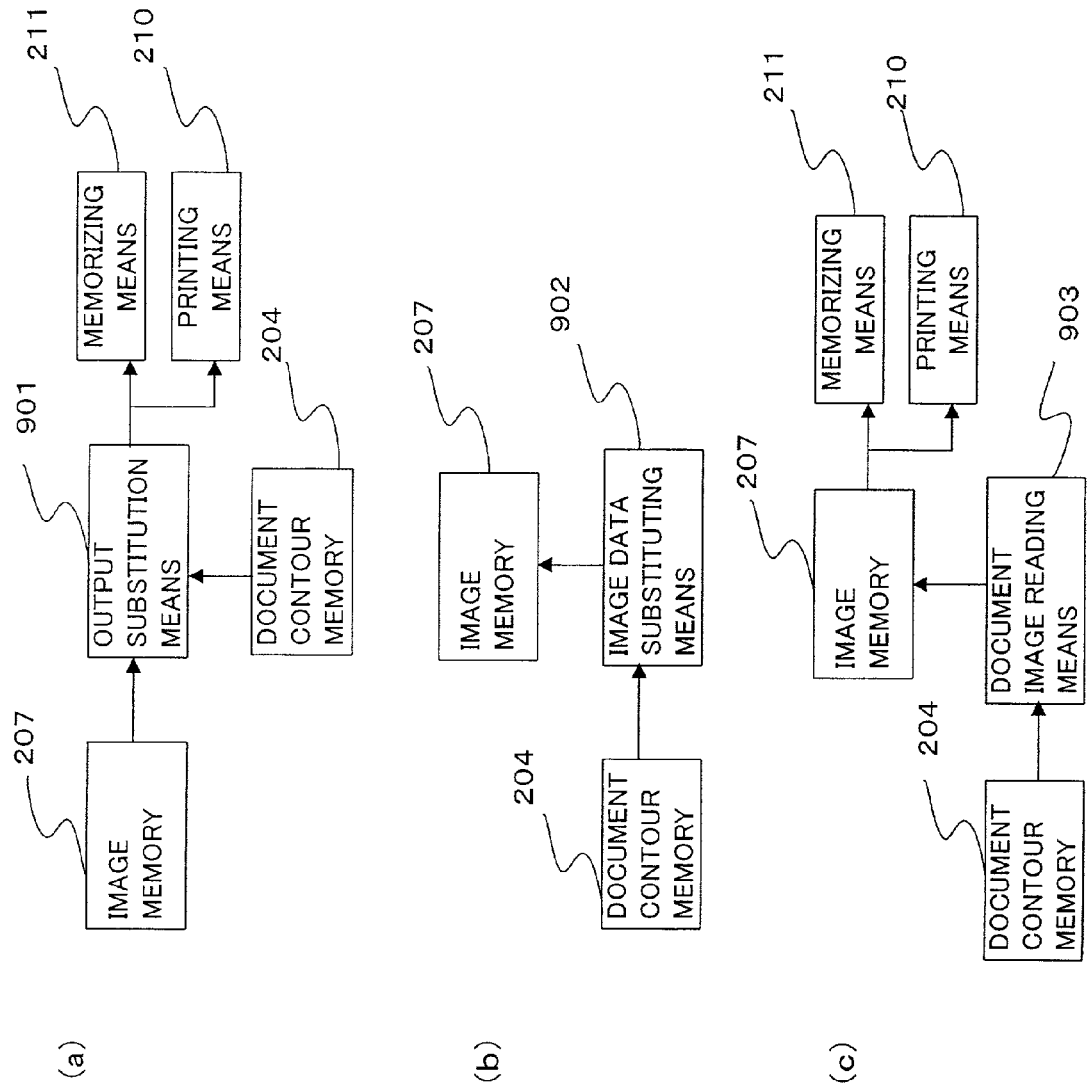

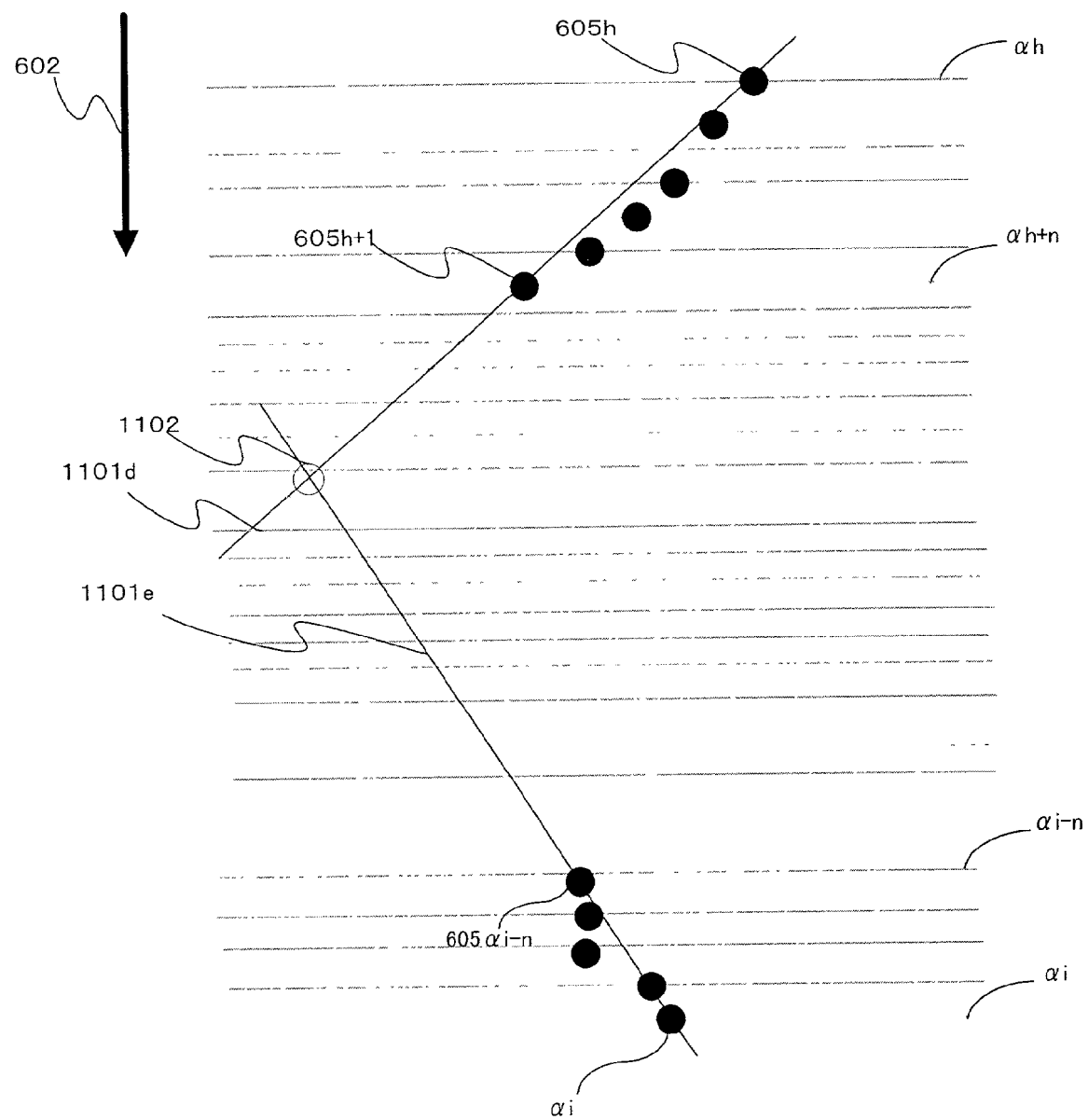
[FIG. 14]

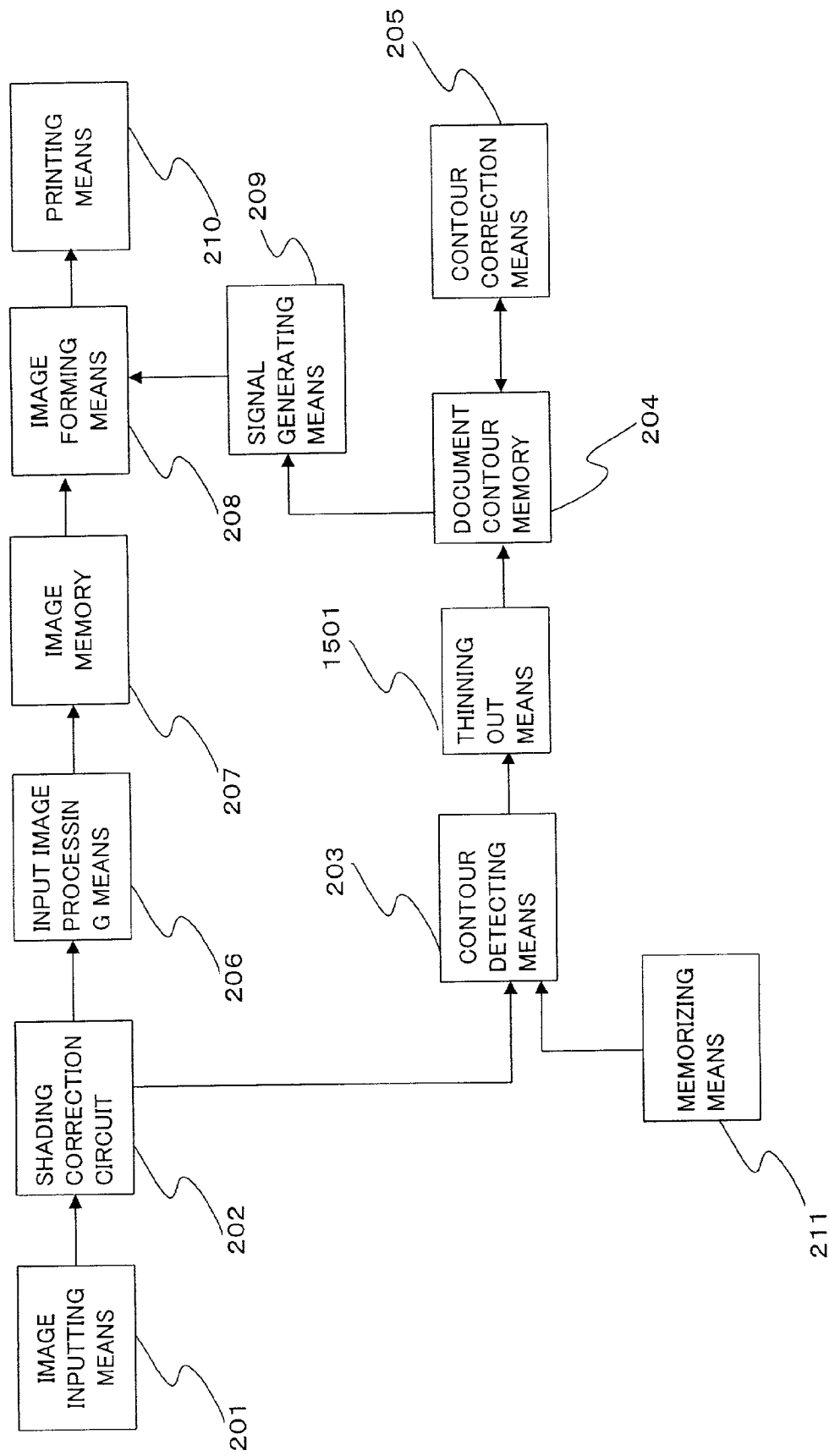

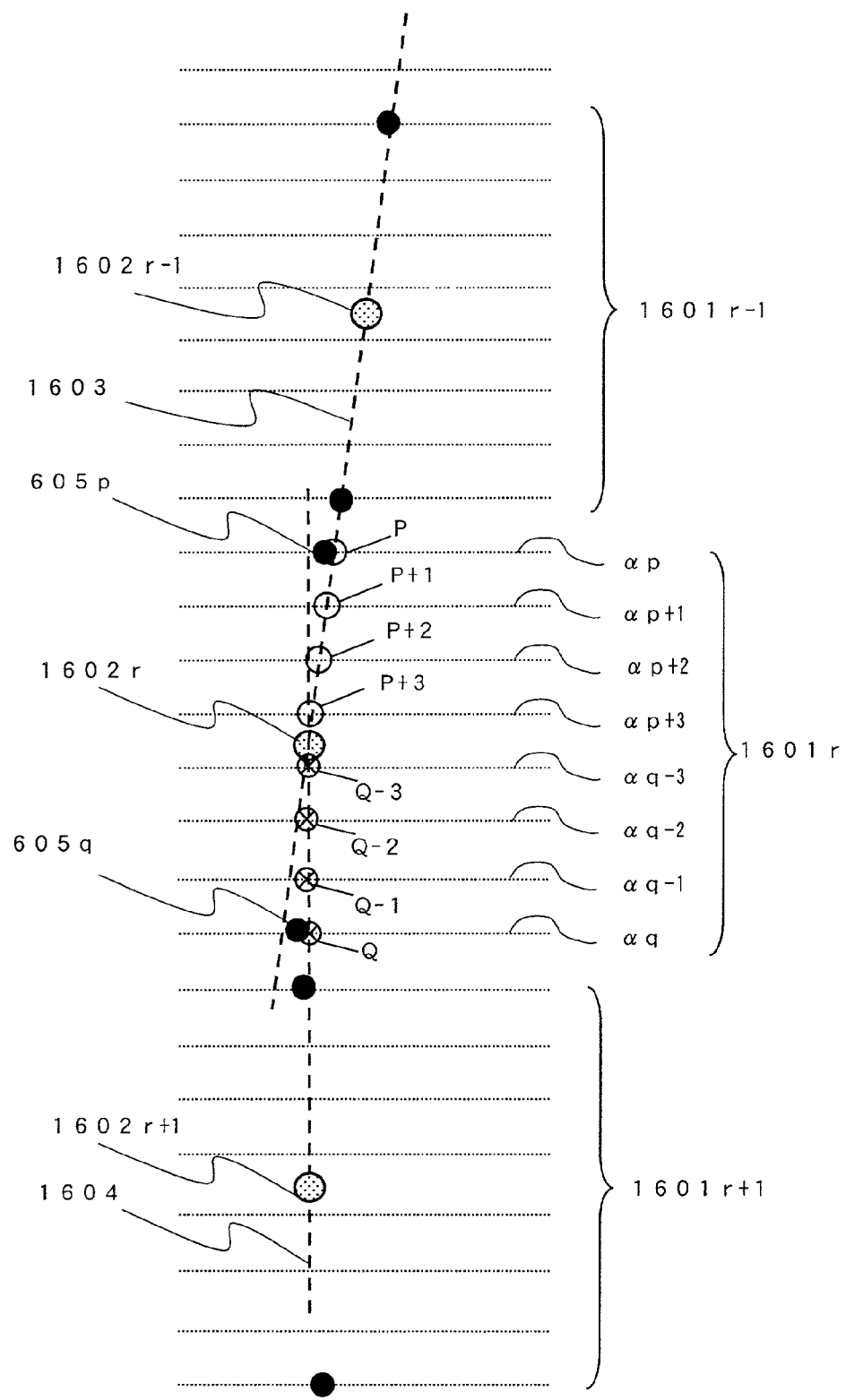

[FIG. 17]
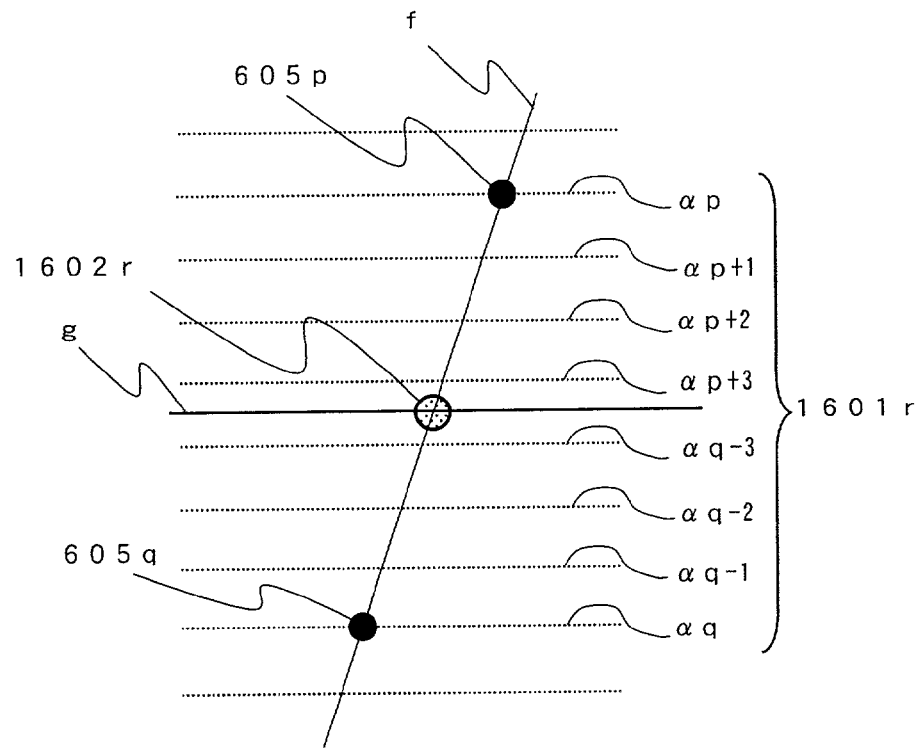
(b)
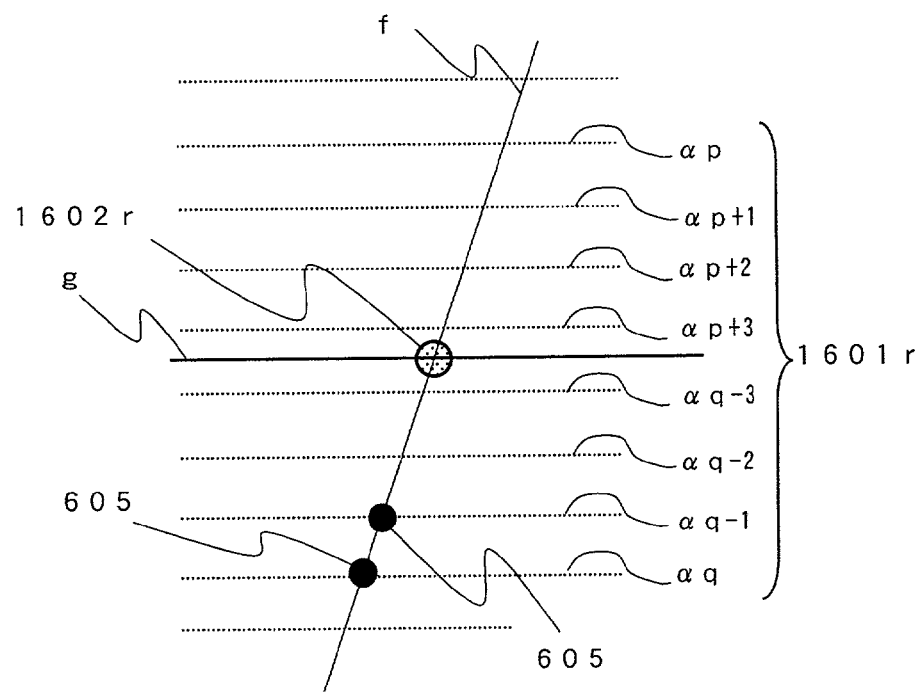

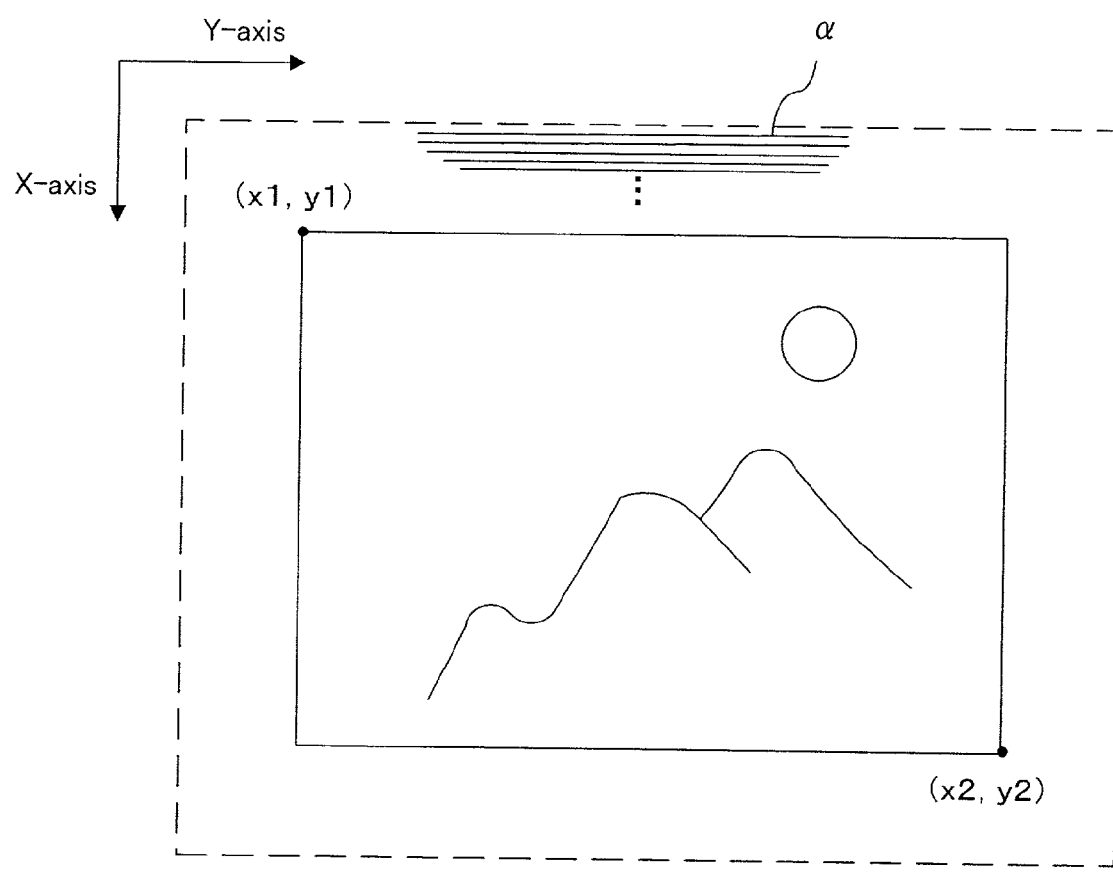
[FIG. 18]

[FIG. 19]
(a)
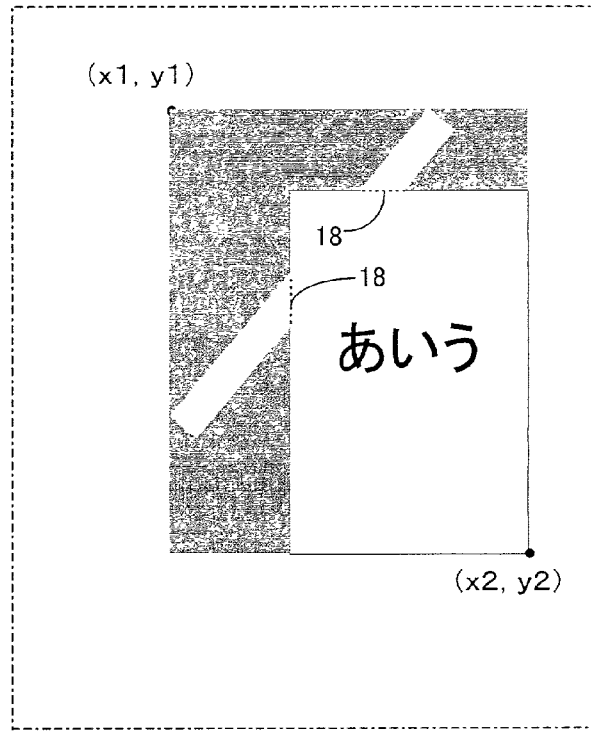
(b)
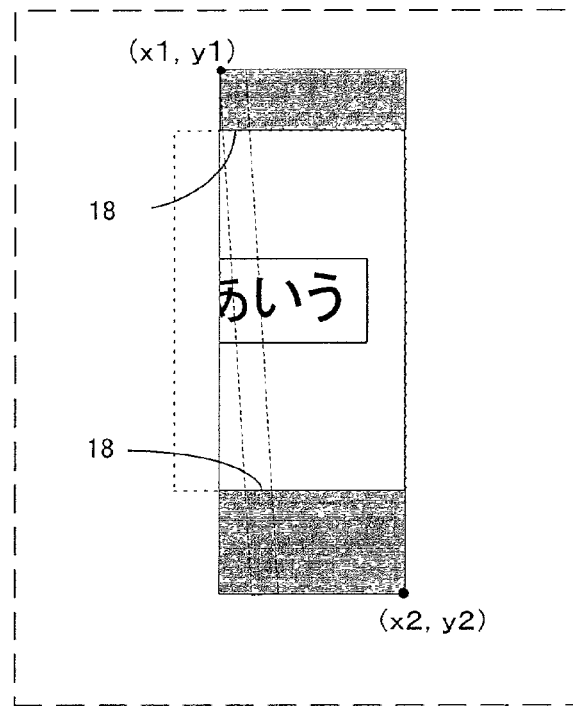

IMAGE READING APPARATUS AND PROCESSING APPARATUS

FIELD OF THE INVENTION

The present invention relates to an image reading apparatus for optically reading a document image. More specifically, this invention concerns the image reading apparatus that can precisely read a document image especially in what is called a sky shot in which a document image is read with the document cover left open.

BACKGROUND OF THE INVENTION

In copying a thick document on a copying apparatus, the document cover can not be closed tight and the copying apparatus is started with the document left open in what is called the sky shot. In a sky shot, an image sensor provided in the copying apparatus reads the area not covered with a document on the document table, that is, the area outside the document contour as black image. Therefore, if the image read is printed by printer or the like, the area around the document contour are printed black, which is undesirable from the point of view of aesthetics and increased consumption of toner.

To address this problem, a copying apparatus is proposed in which the image sensor does not read the area outside the document contour as black image. For example, a copying apparatus described in Japanese unexamined patent application No. 7-23224 finds upper left point (x1, y1) of the document and lower right point (x2, y2) and detects the area defined by a rectangle of the document formed with the line between the upper left point and the lower right point as its diagonal and detects the area as document contour as shown in FIG. 18.

For detection of the upper left point and the lower right point, for example, the copying apparatus scans the document beginning with the top reading line α in FIG. 18 and acquires the density values of the scanned pixels. If the acquired density value of the pixel is larger than a specific threshold value, this pixel is taken as white pixel and if the value is smaller than the threshold value, the pixel is taken as black pixel.

Furthermore, the copying apparatus scans each reading line α and memorizes the first pixel found as white pixel in each reading line α (hereinafter referred to as rise point). And then if a pixel found as black pixel (hereinafter down point) is detected, the distance L between the rise point and the down point will be worked out.

The copying apparatus compares this distance L and a distance threshold value. In case the distance L is larger than the distance threshold value, the copying apparatus recognizes the rise point and the down point as probable edge point thought to be an edge point of the document on the reading line α.

Furthermore, in case the probable edge points are recognized on the object reading line α and the adjacent reading lines α, the copying apparatus decides that the probable edge point recognized on the object reading line α are edge points of the document.

Of the edge points of the document thus obtained, two points are picked up. That is, the copying apparatus takes the value of the x coordinate (x1) of the extremely left edge point of the document, and the value of the x coordinate (x2) of the extremely right edge point of the document positioned. Also, the copying apparatus takes the value of the y coordinate (y1) at the rise point detected in the uppermost reading line α in FIG. 17 and the value of the y coordinate (y2) of the down point detected in the lowest reading line α.

Here, Y axis direction is the direction of main scanning and X axis direction is the direction of sub scanning. Furthermore, the left side is the upper side of the main scanning and right side is the lower side of the main scanning.

As set forth above, the copying apparatus detects the coordinates of the upper left point and the lower right point which are located at the ends of the diagonal of the rectangle and generates a rectangle surrounding the document and defines the document contour with the rectangle.

Then, from the image data read by main scanning, the copying apparatus erases the image outside the document contour on the basis of the document contour defined as described above.

However, the copying apparatus defines the document contour with the coordinates of 2 points as the ends of the diagonal of a rectangle document. In case the document is not a rectangle or the edges of the rectangular document are not placed along the main scanning direction (Y) and sub scanning direction (X), it can happen that there comes out an area within the rectangle where the document is not over lapped and the area will be read as black image by image sensor.

It is also noted that the above copying machine carries out pre-scan prior to the main-scanning the document. And it can happen that the user mistakes pre-scan for main scan and removes the document from the document table. If the document is removed before main scan begins, the image sensor can not read the document.

Furthermore, if a document is copied in a sky shot with the image of a fluorescent lamp in the ceiling projected on the document table, there is a possibility that the image sensor mistakenly detects the area projecting the image of the fluorescent lamp as white image. If the area mistakenly detected is outside the document, the copying apparatus detects a document contour larger than the actual document and leaves a black area in the document image area as shown in FIG. 19(*a*).

Another problem is that if one end portion of the area projecting the light is mistakenly detected as the document edge, part of the document contour is not perceived by the copying apparatus as shown in FIG. 19(*b*), and that part of the document image is cut off.

SUMMARY OF THE INVENTION

It is an object of the present invention to provide an image reading apparatus for reading only the image data in the area where the document is placed and also determining the document contour and reading the document image in one scan, thereby detecting the document edges preciously.

To achieve the foregoing object, the present invention adopts the following means. That is, the image reading apparatus for processing image data outputted from the image sensor is provided with document contour detection means for detecting a probable edge point thought to be the document edge on the basis of the density of the pixels making up the image data. Furthermore, the image reading apparatus has contour correction means for determining whether the probable edge point is a document edge point indicating the document edge.

The document contour detection means has a threshold value set therein which is the same as the quantity of change in density expected to be caused on the border between the document contour and the area outside the document contour, and detects the pixels only, of which the quantity of change in density is not smaller than the threshold value, as probable edge point.

In case a specific probable edge point is detected at a position that is a certain distance or more away from the position where another probable edge point is detected, the contour correction means recognizes that the probable edge point is not a document edge point. Therefore, if a noise creeps in a circuit etc., in the image reading apparatus and if because of the effect of this noise, the document contour detection means detects a probable edge point at a position away from the document edge, the document contour correction means does not recognize the probable edge point as document edge point.

In case a copying action or sky shot is carried out with the document cover left open, there is a possibility that the quantity of change in density will decrease in the document contour and the area outside the document contour because of the effect of light from the fluorescent lamp installed in the ceiling.

Therefore, the document contour detection means has a second threshold value set therein which is the same as the value of the quantity of change in density caused on the border 18 between the document contour and the area outside the document contour projecting the fluorescent lamp when a sky shot copying is carried out. And document contour detection means detects a pixel, of which the quantity of change in density is lower than the threshold value and higher than the second threshold value, as tentative probable edge point. In case no probable edge point is detected on the reading line α to which the tentative probable edge point belongs, the document contour detection means detects this tentative probable edge point as probable edge point.

Even in the case of image data read by the image sensor in a sky shot, therefore, document contour detection means can detect probable edge points.

If the area projecting the fluorescent lamp overlaps with the document contour, the quantity of change in density decreases on the border between the document contour and the projecting area, and it can happen that the document contour detection means cannot detect the pixel on the border as probable edge point.

In that case, the contour correction means acquires positional information on document edge point, and recognizes the document edge point or the border between the document contour and the projecting area on the basis of the locus of the document edge points acquired from a plurality of directions.

BRIEF DESCRIPTION OF THE DRAWINGS

FIG. 1 is a schematic illustration of an image reading apparatus.

FIG. 2 is a block diagram of an image reading apparatus according to Embodiment 1.

FIG. 3 is a block diagram showing the makeup of document contour detection means.

FIG. 4 is a diagram of filter coefficients for calculating the quantity of change in density.

FIG. 5 is a flow chart showing the way of detecting a probable edge point, a tentative probable edge point.

FIG. 6 is a diagram showing probable edge points detected by document contour detection means.

FIG. 7 is a flow chart showing the way of recognizing a document edge point.

FIG. 8 is a diagram showing the permissible scope set by a first way.

FIG. 9 is a diagram showing the permissible scope set by a second way.

FIG. 10 is a diagram showing the permissible scope set by a third way.

FIG. 11 is a flow chart showing the way of setting the document edge point by linear interpolation.

FIG. 12 is a timing chart in image forming means.

FIG. 13 is a schematic diagram of the present invention provided with output substitution means, image data substitution means and document cover image reading means.

FIG. 14 is a diagram showing a method of interpolating the document edge points.

FIG. 15 is a schematic diagram of an image reading apparatus according to Embodiment 3 of the present invention.

FIG. 16 is a diagram showing that a representative value is set in a specific division.

FIG. 17 is a diagram showing that a representative value is set in a specific division.

FIG. 18 is a diagram showing a document image read in a sky shot.

FIG. 19 diagrams defining the document image contour in the prior art.

DESCRIPTION OF THE PREFERRED EMBODIMENTS

In the following embodiments, it is presupposed that there is a fluorescent lamp (installed in the ceiling, for example) over document table 102 of an image reading apparatus 100 in FIG. 1. An projecting area 103 of fluorescent lamp partly overlaps with part of document contour 104 on the document table 102. In this state, a document will be copied with document cover 106 left open in what is called the sky shot. Here, Y axis direction is the direction of main scanning and X axis direction is the direction of sub scanning, furthermore, the left side is the upper side of the main scanning and right side is the lower side of the main scanning as said above.

Embodiment 1

With the document cover 106 left open, the operator inputs instructions to copy in the image reading apparatus 100. Then, image inputting means 201 like an image sensor scans the document table and reads image data. Image inputting means 201 inputs the read image data in shading correction circuit 202

This shading correction circuit 202 subjects the inputted image data to shading correction and inputs the shading corrected image data in contour detecting means 203 for detecting a probable edge point thought to be a document edge and inputs image processing means 206 for edge processing etc.

Closing and opening detection means 211 which detects the opening or closing of the document cover 106 actuates contour detecting means 203 when copying with the document cover open or sky shot is performed.

Acquiring image data outputted from the shading correction circuit 202, the contour detecting means 203 detects the probable edge point from the image data in the following way.

First, the contour detecting means 203 inputs the acquired image data on each reading line α in line buffer means 301 in FIG. 3.

The image data inputted in the line buffer means 301 are read out one after another by density change calculation means 302 for calculating the quantity of change in density of the object pixel in relation to the adjacent pixels.

Figure 4:
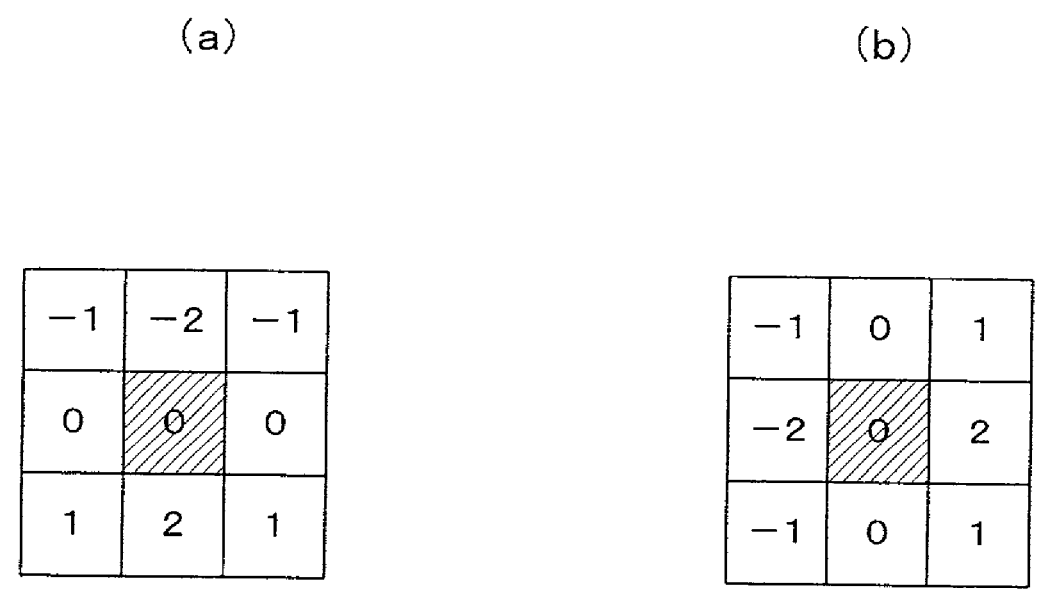

To calculate the quantity of change in density of the object pixel in relation to the adjacent pixels, the density change calculation means 302 reads out the densities of the object pixel and neighboring pixels, for example, 8 pixels surrounding the object pixel, from line buffer means 301. Then, density change calculating means 302 works out the quantities of changes in the vertical and horizontal directions by multiplying each of the read pixels by filter coefficient equivalent of each weight, for example, the filter coefficient of difference filter of 3×3 in the horizontal direction (FIG. 4(*a*)) and the vertical direction (FIG. 4(*b*)) as shown in FIG. 4.

Furthermore, density change calculating means 302 works out a value, to which the quantities of change in density in two directions thus obtained are added, as density change quantity Di. The density change calculating means 302 inputs Di for each pixel in judgement means 306.

The contour detecting means 203 inputs the acquired image data in the line buffer means 301 and also in consecutive points counting means 303. This consecutive points counting means 303 binarizes the density of each of the pixels making up the inputted image data on the basis of a specific slice level, and judges whether the pixel is a black or while one, and furthermore counts how many pixels judged as black were found consecutively after a certain pixel.

In the present embodiment, the consecutive points counting means 303 selects an object pixel from the inputted image data, and if it is judged that all the consecutive 16 pixels counted from the object pixel in the Opposite Main Scanning direction are black pixels, consecutive points counting means 303 brings Left Consecutive Black (LCB) points detection signal BLK_L to high level indicating that black image data come consecutively on the left side of the object pixel, and then outputs the signal to the judgement means 306. If it is judged that none of the consecutive 16 pixels counted from the object pixel in the Opposite Main Scanning direction are black pixels, the consecutive points counting means 303 brings LCB points detection signal BLK_L on the left side of the object image to low level and inputs the signal in the judgement means 306.

Similarly, if 16 or more black pixels are found consecutively in the main scanning direction, Right Consecutive Black (RCB) points detection signal BLK_R is brought to high level, and if 16 or more black pixels are not found consecutively in the main scanning direction, RCB points detection signal BLK_R is brought to low level, and signal is outputted to the judgement means 306.

In the above description, the consecutive points counting means 303 determines whether LCB points detection signal BLK_L and RCB points detection signal BLK_R are outputted on high level or low level depending on whether 16 or more black pixels are found consecutively. The number of pixels as basis for choosing between high level and low level is not restricted to 16 pixels but may be any value.

The judgement means 306 detects probable edge points thought to be the document edge points on the basis of the LCB points detection signal BLK_L and RCB points detection signal BLK_R outputted by the consecutive points counting means 303, density change quantity Di outputted by density change calculating means 302 and threshold value TH1 set by CPU 304. In this embodiment, furthermore, judgement means 306 also detects tentative probable edge points tentatively thought to be the document edge points on the basis of a second threshold value TH2 (hereinafter "threshold value TH2") which is lower than the threshold value TH1 set in CPU 304.

Here, threshold value TH1 is a value of the quantity of change in density thought to be caused in the usual sky shot (in case no light from the fluorescent lamp is directly projected on the document edge). Threshold value TH2 is a value of the quantity of change in density thought to be caused on the border 600 in FIG. 6 between projecting area 103 on which the light from the fluorescent lamp is projected directly and the document contour 104 in a sky shot carried out with the document edge directly projecting the light of the fluorescent lamp.

Hereinafter, the probable edge point to be detected as probable edge point on the left side by the judgement means 306 will be called first probable edge point, and the probable edge point to be detected as tentative probable edge point on the left side will be called tentative first probable edge point.

After inputting the density change quantity Di of the respective pixels making up specific image data, the LCB detection signal BLK_L and the right continuous black point detection signal BLK_R, the judgement means 306 proceeds to the processing for detection of the probable edge point or tentative probable edge point.

It is noted that the judgement means 306 checks pixels belonging to the respective lines one after another from left and detects the probable edge point or tentative probable edge point.

Judgment means 306 first judges whether the LCB points detection signal BLK_L and RCB points detection signal BLK_R corresponding to specific pixels belonging to a specific reading line α are both on low level as shown in a flow chart in FIG. 5(S1). If it is judged that the LCB points detection signal BLK_L and RCB points detection signal BLK_R are both on low level, judgement means 306 judges that density change in the object pixel is due to characters or patterns drawn on the document and makes the above-mentioned Di for the object pixel 0 (S2).

Next, to judge whether the object pixel is a probable edge point, the judgement means 306 determines whether the above-mentioned Di for the object pixel is not smaller than threshold value TH1. If Di is smaller than threshold value TH1, judgement means 306 excludes the object pixel from the objects for detection of the probable edge point (S3, N). If it is judged that the above-mentioned Di for the object pixel is larger than threshold value TH1, judgement means 306 determines whether the LCB points detection signal BLK_L is on high level (S3–S4). If the LCB points detection signal BLK_L is on high level and if the probable edge point is not detected in reading line α to which the object pixel belongs, judgement means 306 detects the object pixel as first probable edge point 605 (S5–S6).

In case the first probable edge point 605 is already detected on the reading line α to which the object pixel belongs, judgement means 306 determines whether RCB points detection signal BLK_R is on high level. If it is on high level, judgement means 306 detects the object pixel as the second probable edge point (S5–S7–S8).

In case the above-mentioned Di for the object pixel is larger than the threshold value TH1 and the LCB points detection signal BLK_L is on low level, the object pixel is detected as the second probable edge point (S9). It is noted that in case a plurality of second probable edge points are detected on one reading line α, judgement means 306 detects the second probable edge point last detected alone as a second probable edge point.

In case the above-mentioned Di of the object pixel excluded from the objects for detection of the probable edge point is larger than the threshold value TH2 and in case the above-mentioned first probable edge point 605 or the first tentative probable edge point is not detected yet on the reading line α to which the object pixel belongs, the judgement means 306 judges the object pixel as first tentative probable edge point and moves the object for processing to the next pixel ((S10–S12–S14).

On the other hand, in case the first probable edge point 605 and the first tentative probable edge point are already detected, the judgement means 306 judges the object pixel as the second tentative probable edge point and moves the object for processing to the next pixel (S10–S13–S14).

In case a plurality of the tentative second probable edge points are detected on one reading line α, the judgement means 306 judges the second tentative probable edge point detected last only as second tentative probable edge point.

The first tentative probable edge point or second tentative probable edge point is temporarily memorized in Tentative Probable Edge (TPE) point memorizing means 307 until the scanning of one reading line α is completed. In case the first probable edge point 605 is not detected on a specific reading line α, judgement means 306 detects the first TPE point, temporarily stored in the TPE point memorizing means 307, as the first probable edge point 605. Similarly, the second TPE point is processed the same way.

In case the above-mentioned Di for the object pixel is less than threshold value TH2, the judgement means 306 decides that the object pixel is not a probable edge point or a TPE point and move to the processing of next image ((S10, N–S14).

In case two or more pixels of which the density change quantity Di is the threshold value TH2 or higher can not be detected on a specific reading line α, judgement means 306 interprets that the probable edge point and TPE point detected on the reading line α are not detected and decides that the reading line α is an invalid line.

If detection of probable edge points on the respective lines is over, contour detecting means 203 stores positional information on the probable edge points detected on the reading line α in document contour memory 204 as line information on the reading line α. If a specific reading line α is determined as invalid line, information to the effect that the reading line α is an invalid line is stored in document contour memory 204 as line information on the reading line α.

In the present embodiment, meanwhile, a sky shot is carried out with a fluorescent lamp (installed in the ceiling, for example) above the document table 102 as shown in FIG. 1. Therefore, pixels found in the edge of the projecting area 103 has a large quantity of change in density due to the effect of the fluorescent lamp, and therefore contour detecting means 203 could detect those pixels as probable edge points.

Therefore the probable edge points stored in the document contour memory 204 are read out by contour correction means 205, and it is judged by contour correction means 205 whether the probable edge points are document edge points.

Now let it be supposed that contour detecting means 203 has detected the probable edge points at a position indicated as intersection point of solid lines or dotted lines in FIG. 6, and there will be explained about the processing in which the contour correction means 205 recognizes the document edge points. In FIG. 6, the part indicated by solid line indicates the portion where the probable edge points have been detected on continuous reading line α. The part indicated by dotted line and alternate long and short dash line indicate the portion where lines with the probable edge points detected and lines with the probable edge points not detected are mixed. In addition, the part indicated by alternate long and short dash line is the portion where more probable edge points are detected than in the part indicated by dotted line.

To judge whether the probable edge point is a document edge point, the contour correction means 205 reads out line information on each reading line α from the head of the document to the bottom (in the direction indicated by arrow 602) from document contour memory 204.

If the invalid line information is detected from the acquired line information, the contour correction means 205 recognizes the reading line α as the invalid line and acquires line information on the next reading line α (S21, Y). Also, detecting the probable edge points from line information, the contour correction means 205 moves to the step to judge whether the probable edge points are the document edge points (S21, N).

In judging whether the probable edge point is a document edge point, the contour correction means 205 detects the document edge points on the right and left sides independently, but in the following description, the detection of the left document edge points on the left side of the document will be explained.

The contour correction means 205 acquires line information starting with the uppermost reading line α0 one after another as shown in FIG. 6. If the first reading line αj (j:positive integer indicating the order in which the line is read) that is not an invalid line is detected, the contour correction means 205 extracts positional information on the first probable edge point 605j from the line information and memorizes the information.

Furthermore, the contour correction means 205 detects positional information on the first probable edge point 605 from line information of a specific number (n) of consecutive reading lines α(j+1~αj+n) from the above-mentioned reading line α(j) and memorizes the positional information. Here, the contour correction means 205 counts the number of first probable edge points 605 detected on the specific number(n) of consecutive reading lines α(j+1)~α(j+n) from the reading line αj to which the first probable edge point 605 belongs (S22).

In case the number of the first probable edge point 605 counted is not higher than a specific number, the contour correction means 205 judges that the first probable edge point 605 is not a left document edge point but a probable edge point which is an edge of projecting area 103, and moves to the step where the document edge point of the next reading line α(j+1) is recognized (S23).

The reason why the contour correction means 205 judges that the first probable edge point 605 is a probable edge point indicating an edge of projecting area 103 is that the fluorescent lamp goes on and off in a specific cycle. That is, when the fluorescent lamp is on and the light is projected on the projecting area 103, image inputting means 201 perceives the projecting area 103 as white image. Therefore, it can happen that the contour detecting means 203 judges that the density change quantity Di of the pixel located in the edge of the projecting area 103 is larger than the threshold value TH1. Therefore, the contour detecting means 203 sometimes detects the pixel located in the edge of the projecting area 103 as the probable edge point.

On the other hand, in case the fluorescent lamp is projected, image inputting means 201 reads the pixel located in the projecting area 103 as black pixel. Therefore, the contour detecting means 203 does not detect the pixel located in the edge of the projecting area 103 as the probable edge point.

Of the pixels located in the edge of the projecting area 103, therefore, contour detecting means 203 detects as the probable edge point the pixels only located in the edge of the projecting area 103 read while the fluorescent lamp is on. Therefore, the contour detecting means 203 can not detect as probable edge point the pixels located in the edge of the projecting area 103 in consecutive reading lines α.

By making a judgement that way, the contour correction means 205 prevents the first probable edge point 605 indicating the edge of the projecting area 103 from being recognized as left document edge point.

Meanwhile, the change of pixel in density located on the border between document contour 104 and the area outside the document contour is caused by the presence and absence of the document irrespective of whether the fluorescent lamp is on or off.

For this reason, for example, the contour detecting means 203 detects the probable edge point on a reading line a specific number of consecutive reading lines α(k+n) (k:positive integer indicating the order in which the line is read) away from the reading line αk to which the first probable edge point 605k shown in FIG. 6 belong.

Therefore, the contour correction means 205 recognizes the first probable edge point 605k as left document edge point.

Recognizing the first probable edge point 605k as left document edge point, the contour correction means 205 proceeds to the step where the left document edge point of the next reading line α(k+1) is recognized.

When the left document edge point is recognized on a reading line a specific number of consecutive reading lines α away, the contour correction means 205 adds to the requirements for recognizing the left document edge point the requirements that the first probable edge point 605, object for recognition of the left document edge point, is detected within the permissible scope obtained in the method given below.

The reason why such requirements are added is that in spite of presence of the edge of document contour 104 on a specific reading line α as shown in FIG. 6, it can happen that the contour detecting means 203 detects pixels located in the edge of the projecting area 103 as probable edge point due to the effect of the light from the fluorescent lamp. Therefore, even if an probable edge point can be detected on a reading line the probable edge point sometimes is a probable edge point indicating the edge of the projecting area 103.

The method of obtaining the above-mentioned permissible scope is available in three ways. Considering the form etc., of the document, the user indicates to the image reading apparatus which of the three ways to use, one or a combination of them. It is also noted that the user may so set image reading apparatus 100 to use only one way out of the three beforehand.

In the first way, the contour correction means 205 works out gradient A of straight line passing the first probable edge point 605 (X3, Y3) detected on the 16th reading line α3 before the reading line α1 to which probable edge point (X1, Y1), object for recognition of the left document edge point, belongs and the first probable edge point 605 (X2, Y2) detected on the reading line α2 just before the object reading line α1 with the reading line direction as X-axis and with the direction perpendicular to the X-axis as Y-axis as shown in FIG. 8.

In case the 16th reading line α3 before and one reading line α2 before the reading line α1 are invalid lines, the contour correction means 205 works out gradient A of the straight line passing the first probable edge point 605 detected on a neighboring line α4, α5, for example. In addition, in case the reading line α is within the 16th line from the reading line α where the first probable edge point 605 was first detected, the contour correction means 205 works out the gradient A of the straight line passing the coordinates of the first probable edge point 605 first detected and the probable edge point (X2, Y2).

After working out gradient A, the contour correction means 205 determines a scope having straight line with gradient A passing within the scope (for example, a scope between straight line 802a passing (X3, Y3) having a gradient with gradient A multiplied by 2 and ½ and straight line 802b) as permissible scope 803.

However, if gradient A approaches infinity (approaches the vertical line), the permissible scope will be extremely limited. Therefore, there is a second way in which when value B is with in a permissible scope 901 as shown in FIG. 9, the first probable edge point 605(X1, Y1) is recognized as document edge point. In here, B is absolute value |X4−X1| of the difference of X coordinates between the first probable edge point 605(X4, Y4) detected on a specific reading line α4 and the first probable edge point 605(X1, Y1),and X4 is X coordinate just before the X1. And X4 may be several lines before the X1. determines a specific scope as permissible scope 901 as shown in FIG. 9.

In the first way, a permissible scope is determined on the basis of the gradient of straight line 801 passing two first probable edge point 605, and a first probable edge point within a specific distance from the straight line is recognized as document edge point.

Therefore, if an angle 1003 of the document is present between (X1, Y1) and (X11, Y11) and even if a first probable edge point 605, object for recognition of a document edge point, (for example, (X1, Y1) in FIG. 10), is a pixel that turns out to be a document edge point, it will be located outside permissible scope 803.

The third way involves finding three straight lines setting a permissible scope that pass two probable edge points detected on the reading line α 16 reading lines away and determining the permissible scope 1001 on the basis of the gradients of three Permissible Scope-Setting(PSS) straight lines.

The first PSS straight line a is a straight line passing the first probable edge point 605 (X1, Y1), object for recognition of the left document edge point, and probable edge point (X11, Y11) detected on the reading line α11, 16 reading lines away from the first probable edge point 605. The PSS straight line b is a straight line passing the first probable edge point 605 (X6, Y6) detected on the reading line α6 just before the first probable edge point 605 (X1, Y1), object for recognition of left document edge point, and the first probable edge point 605 (X16, Y16) detected on the reading line α16, 16 reading lines away from the reading line α6 to which the first probable edge point 605 (X6, Y6) belongs. The third permissible scope-setting straight line c is a straight line passing the first probable edge point 605 (X8, Y8) detected on the reading line α8 two reading lines before the first probable edge point 605 (X1, Y1), object of recognition of left document edge point, and probable edge point (X18, Y18) detected on the reading line α18, 16 reading lines away from the reading line α8 to which the first probable edge point 605 (X8, Y8) belongs.

After preparing the three PSS straight lines, the contour correction means 205 judges whether the following values are positive. That is, values of {(gradient of the first permissible scope-setting straight line a)·(gradient of the second permissible scope-setting straight line b)} and {(gradient of the second permissible scope-setting straight line b)·(gradient of the third permissible scope-setting straight line c)}.

If the values are both positive, an angle 1003 of the document will be present between reading line α1 and reading line α11 as shown in FIG. 10.

Therefore, if it is judged that there is an angle 1003 of the document, the contour correction means 205 will see that permissible scope 1001 on reading line α1 to which the first probable edge point 605 (X1, Y1) belongs extends longer than permissible scope 803 obtained from the method indicated by FIG. 8, on the right side.

The reason why permissible scope 1001 is extended longer than permissible scope 803 on the right side is that the points making up left side member 1004 extends to right in the area below the points. (See the relations between the points (X8, Y8), (X6, Y6), and (X1, Y1), in FIG. 10).

In case the first probable edge point 605 (X1, Y1) is within a permissible scope as mentioned above, contour correction means 205 recognizes the probable edge point as document edge point and stores positional information on the recognized document edge point in the document contour memory 204 (S24).

On the other hand, in case the probable edge point is not within the permissible scope, the contour correction means 205 recognizes the reading line α1, to which the first probable edge point 605 (X1, Y1) belongs, as invalid line (S23).

After judging whether the first probable edge point 605 detected on a specific reading line α is a document edge or not, the contour correction means 205 determines whether the first probable edge point 605 detected on the next reading line α is a document edge or not. Finishing checking whether the first probable edge point is a left document edge point or not on all the reading lines α, the contour correction means 205 ends the recognition processing (S25).

Finishing judging whether the first probable edge point 605 is a document edge or not on all the reading lines α, the contour correction means 205 proceeds to processing for interpolation of the document edge on the reading line α recognized as invalid line by the contour detecting means 203 and the contour correction means 205.

As shown in a flow chart in FIG. 11, the contour correction means 205 first perceives invalid lines recognized between the reading line α where a probable edge point was first detected by contour detecting means 203 and the reading line α where a probable edge point was last detected (S31).

To interpolate the document edge point on the perceived invalid line, the contour correction means 205 acquires from document contour memory 204 positional information on left document edges recognized on the reading line α next to the invalid line and the previous reading line α (S32).

It is noted that in case the next reading line α or the previous reading line α is an invalid line, the contour correction means 205 acquires from document contour memory 204 positional information on left document edge points recognized on the reading line α after next or the reading line α two reading lines a before the invalid line.

The intersection point of straight line passing two left document edge points recognized as mentioned above and the invalid line, is regarded as left document edge point on the invalid line, the contour correction means 205 interpolates the left document edge point on the invalid line (S33).

When the contour correction means 205 interpolates the left document edge points on all the reading lines α recognized as invalid line, interpolation of the left document edge points will end (S34).

The contour correction means 205 stores positional information on the interpolated left document edge points in document contour memory 204.

If the contour correction means 205 interpolates the left document edge points on all the reading lines α recognized as invalid lines as described above, the left document edge points can be recognized on the reading lines α from the reading line α where the probable edge point was first detected by contour detecting means 203 to the reading line α where the probable edge point was last detected.

Likewise, the contour correction means 205 does processing for recognizing right document edge points on the basis of the second probable edge points and stores positional information on the recognized right document edge points in document contour memory 204 in the same way as processing for recognizing left document edge points.

As described, the contour correction means 205 judges whether the respective probable edge points are document edge points on the basis of the position of each probable edge point detected by contour detecting means 203 on the basis of the quantity of change in density of pixel. Therefore, even if image inputting means 201 reads the density of a specific pixel which is different from the actual density due to the effect of the fluorescent lamp etc., and contour detecting means 203 detects the pixel as probable edge point, the pixel will not be taken as document edge by the contour correction means 205.

The positional information on document edge points stored in document contour memory 204 is read out by signal generating means 209 which generates effective width signal LEN indicating the document contour. The signal generating means 209 form effective width signal LEN for each reading line α on the basis of the read positional information on left and right document edge points 1202*l*, 1202*r* in FIG. 12(*b*).

Meanwhile, image data subjected to shading correction by the shading correction circuit 202 undergoes different forms of image processing by input image processing means 206 such as edge emphasizing, and smoothing as necessary, gradation conversion and the like and then is stored in image memory 207.

If effective width signal LEN corresponding to a specific reading line α is formed and the image data on the reading line α is stored in image memory 207 as described above, image forming means 208 acquires effective width signal LEN corresponding to the object reading line α from signal generating means 209. At this moment, furthermore, image forming means 208 reads out image data on the object reading line α from image memory 207.

The image forming means 208 synchronizes image data containing the area outside the document image area 1201 and effective width signal LEN as shown in FIG. 12(*a*) and perceives the area, where image data outputted from image memory 207 overlaps with effective width signal LEN, as document contour 104 as shown in FIG. 12(*c*). Then, image forming means 208 erases image data recognized as area outside the document contour and outputs the data to printing means 210, for example, a printer.

That makes it possible to eliminate image data outside the document contour from the print in a sky shot. The image outside the document contour in a sky shot can be cut out in other than the above method, too.

For example, the image reading apparatus 100 is provided with output substitution means 901 as shown in FIG. 13(*a*) which perceives the outside of the document contour on the basis of the document edge point read out from the document contour memory 204. Of the image data read out from image memory 207, the outside of the document contour is re-read into white image data and outputted to printing means 210, or memorizing means 211 etc.

Alternatively, there may be provided image data substituting means 902 as shown in FIG. 13(b) which perceives the outside of the document contour on the basis of the document edge points read out from document contour memory 204 and substitutes with white image data the outside of the document contour of image data stored on image memory 207.

As another alternative, document image reading means 903 may be provided as shown in FIG. 13(c) which perceives the document contour from the positional information on the document edge point read out from the document contour memory 204, and outputs only the out image data corresponding to the document contour and perceived area out of the image data stored in image memory 207 and outputs the data alone to printing means 210, memorizing means 211 or the like.

It is noted that FIG. 13 is a diagram showing means only for cutting out image data outside the document contour by utilizing image data stored in image memory 207 and the document edge points stored in document contour memory 204.

The outputting destination to which output substitution means 901 and document image reading means 903 output image data is not limited to printing means 210 but may be memory storage provided in image reading apparatus 100, or memory media such as CD-ROM.

In case image reading apparatus 100 is connected to a network such as a local area network (LAN), the output substitution means 901 may output image data to a server for the network or a memory storage connected to the network.

In this specification, projecting area 103 is defined as an area on document table 102 where the image of a fluorescent lamp is projected. But an area on document table 102 where the image of an alternating current discharge lamp installed outside image reading apparatus 100 is projected may also be called projecting area 103.

Embodiment 2

In Embodiment 1, the contour correction means 205 reads reading lines α one after another starting with the uppermost line as shown in FIG. 6 and processes and recognizes the left document edge points on the basis of the first probable edge points 605 extracted from line information.

However, as scanning moves from the first probable edge point 604 at the upper end of document contour 104 in the direction of arrow 602 as shown in FIG. 6, the edge of the document contour 104 approaches the projecting area 103. As the edge of the document contour 104 approaches the projecting area 103, the effect of the incident light from a fluorescent lamp increases. Because of that, the image inputting means 201 sometimes perceives peripheral pixels in the edge of document contour 104 as white image.

Therefore, the possibility will be high that the contour detecting means 203 fails to detect the pixel corresponding to the edge of document contour 104 as the first probable edge point 605. Meanwhile, the detection of pixels corresponding to the edge of the projecting area 103 as the first probable edge point 605 will increase.

For that reason, the probability will decrease that the probable edge points are present within such a permissible scope as mentioned above, and recognition of document edge points will have to rely on linear interpolation described in Embodiment 1. But much interpolation would deteriorate the accuracy of detection position of the document edge. Especially, if linear interpolation is performed on the basis of two document edge points forming the corner of the document.

Therefore, the contour correction means 205 reads line information on the reading line α along the direction of arrow 602, and finishes recognizing the left document edge points in the direction of arrow 602 if the left document edge point can not be recognized in a specific number of consecutive reading lines α. Then, the contour correction means 205 reads line information in the opposite direction of arrow 602 shown in FIG. 6 and begins the processing for recognition of the left document edge points from the first probable edge point 605.

As in the above case, however, as the document contour 104 approaches the projecting area 103, detection of the pixels corresponding to the edge of the projecting area 103 as the first probable edge point 605 will increase. Here, too, when it becomes impossible to recognize the left document edge points on a specific number of consecutive reading lines α, the contour correction means 205 will finish recognizing the left document edge points.

When the processing for recognizing the left document edge points in both directions is over, the contour correction means 205 recognizes reading line α as impossible-to-detect line if the left document edge points can not be recognized in recognition of the left document edge points in the direction of arrow 602 and recognition of the left document edge points in the opposite direction of arrow 602.

Then, the contour correction means 205 prepares correction line 1101d that passes the left document edge point 605h+n last recognized in recognition of the left document edge points in the direction of arrow 602 and the left document edge point 605h belonging to the reading line αh (h:positive integer indicating the in which the line is read) a specific number of lines before the reading line αh+n to which the left document edge point 605h+n belongs as shown in FIG. 14.

Likewise, the contour correction means 205 prepares correction line 1101e that passes the left document edge point last recognized in recognition of the left document edge points 605i−n in the opposite direction of arrow 602 and the left document edge point 605i (i:positive integer indicating the order in which the line is read) belonging to the line a specific number of reading lines αi before the reading line αi−n to which the left document edge point 605i−n belongs as shown in FIG. 14.

When it prepares correction lines 1101d, 1101e, the contour correction means 205 finds intersection point 1102 between two correction lines 1101d, 1101e and performs interpolation of document edge points.

In the impossible-to-detect lines above intersection point 1102 as shown in FIG. 14, the contour correction means 205 recognizes the intersection point between correction line 1101d and the impossible-to-detect line as document edge point. In the impossible-to-detect lines below intersection point 1102, on the other hand, the contour correction means 205 recognizes the intersection point between correction line 1101e and the impossible-to-detect line.

If the left document edge points are interpolated on the basis of two correction lines 1101d, 1101e, the detection position accuracy of the document edge points near the corners of the document can be raised.

It is noted that the contour correction means 205 may be so arranged to perform detection of the document edge point in two directions whether there are impossible-to-detect lines or not.

Embodiment 3

As in Embodiment 1, there will be described an example where the left document edge is recognized.

As in Embodiment 1, if the contour detecting means 203 detects the probable edge point and invalid line, line information on the reading line α is read out by thinning out means 1501 as in FIG. 15. With 8 consecutive reading lines α as one division 1601 as shown in FIG. 16, for example, the thinning out means 1501 reads out line information of the first and last reading lines α in the division 1601.

The thinning out means 1501 extracts positional information on the first probable edge point 605p, 605q from line information of the first and last reading lines αp , αq (p, q:positive integer indicating the order of each reading line, and works out the middle point of two probable edge points as representative value 1602.

In case the first or last reading line αp, αq of the read 8 reading lines α is an invalid line, the thinning out means 1501 works out the representative value 1602 on the basis of the position of the first probable edge point 605 detected on a reading line αp+1(αP−1), or αq+1(αq−1) adjacent to the first or last reading line αp, αq. In the division 1601, in addition, in case there is only one first probable edge point 605, the thinning out means 1501 recognizes the first probable edge point 605 as the representative value 1602. Furthermore, in case 8 reading lines α belonging to a specific division 1601 are all invalid lines, the thinning out means 1501 recognizes the division 1601 as invalid value.

Furthermore, thinning out means 1501 may work out representative value 1602 in the following way. That is, thinning out means 1501 prepares straight line f that passes first probable edge point 605p and first probable edge point 605q. Then, thinning out means 1501 finds the intersection point between straight line equally distant away from reading line αp and αq (hereinafter referred to as median line g) and straight line f. The intersection point will be taken as the representative value 1602r. If representative value 1602r is found that way, the central position in the direction of sub-scanning of division 1602r will be worked out as representative value 1602r even if first probable edge point 605 is detected only on reading lines αq·1, αq in division 1601r as shown in FIG. 17(b).

In the present embodiment, the thinning out means 1501 regards 8 reading lines α as one division 1601 as shown in FIG. 16. The number of reading lines α constituting one division may be changed as necessary.

Positional information between the representative value 1602 recognized by the thinning out means 1501 and the division 1601 recognized as invalid is stored in the document contour memory 204. Therefore, the document contour memory 204 just has to memorize only one positional information (positional information on the representative value 1602 or the division 1601 taken as invalid) for 8 reading lines α. That is, the memory capacity needed is only one eighth that in Embodiment 1 in which line information (positional information on the first probable edge point 605 and the invalid line) has to be memorized for each line.

Positional information on the representative value 1602 and invalid value stored in the document contour memory 204 is read out by the contour correction means 205. Here, the contour correction means 205 handles the representative value 1602 in the same way as the first probable edge points 605 in Embodiment 1 and handles the division 1601 judged as invalid value in the same way as invalid line in Embodiment 1, and the processing is performed to recognize the representative value 1602 as left document edge point.

Here, for one division 1601, only one left document edge point is stored in the document contour memory 204. That is, of the reading lines from the reading line α where the probable edge point was first detected by contour detecting means 203 to the last reading line α, left document edge points alone are recognized on part of the reading lines α alone. That is, on most of the reading lines α, the document contour on the left side remains unsettled.

Therefore, the contour correction means 205 recognizes left document edge point for each division 1601 and proceeds to the processing for recognition of left document edge point on each reading line α.

That is, the contour correction means 205 perceives the positions of left document edge points of a specific division 1601r and left document edge points in divisions above and under the division 1601r+1, 1601r−1. Then, the contour correction means 205 prepares correction line 1603 passing the left document edge point 1602r of a specific division 1601r and the left document edge point 1602r−1 of the adjacent upper division 1601r−1, and recognizes four intersection points P~P·3 between the correction line 1603 and uppermost four reading lines αp~p·3 in a specific division 1601.

Similarly, the contour correction means 205 prepares correction line 1604 passing the left document edge point 1602r of a specific division 1601r and the left document edge point 1602r+1 of the lower neighboring division 1601r+1, and recognizes four intersection points Q·3~Q between the correction line 1604 and the lowest four reading lines αq·3~q in a specific division 1601.

Finishing recognizing the left document edge point of each reading line α, the contour correction means 205 inputs positional information on the recognized left document edge point in the document contour memory 204.

In the present invention, document contour detecting means and contour correction means recognize document edge points on the basis of image data outputted from the image sensor. Therefore, there is no need to perform pre-scanning to determine document edge points.

Furthermore, document edge points are detected on the basis of the positions of image density and probable edge points. Therefore, even if document contour detecting means reads the area projecting the fluorescent lamp as white image, contour correction means does not recognize the edge of the area as document edge point.

In addition, a specific number of reading lines α is taken as one division, and one probable edge point in the division is recognized. On the basis of the probable edge point, document edge point is recognized for each division, thereby reducing the burden on contour correction means.

The invention claimed is:

1. An image reading apparatus for processing, for each reading line, image data outputted from an image sensor, said apparatus comprising:
    contour detecting means for detecting, for each object reading line, pixels with the quantity of change in density higher than a threshold value as probable edge points thought to be document edge points and an edge point of a projecting area where a light source outside the image reading apparatus is projected, and
    contour correction means for determining whether each probable edge point is the edge point of the projecting area or not, on the basis of the position of said probable edge points, said contour correction means recognizing the probable edge points except the edge point of the projecting area as the document edge points.

2. The image reading apparatus of claim 1 wherein said contour detecting means is provided with density change calculating means for working out the quantity of change in density on the basis of the image density of pixels around an object pixel.

3. The image reading apparatus of claim 2 wherein said contour detecting means is provided with judgement means for detecting the object pixel as a probable edge point if the values of the respective pixels are identical when the densities of a specific number of consecutive pixels either in the direction of scanning or opposite direction of scanning are binarized on a specific slice level.

4. The image reading apparatus of claim 1 wherein said contour correction means determines as permissible scope a scope of a specific distance on an object reading line on the basis of a straight line passing through two probable edge points detected on separate reading lines between which a specific number of reading lines are intervened, and recognizes a probable edge point on the object reading line in said permissible scope as a document edge point.

5. The image reading apparatus of claim 1 wherein said contour correction means determines as permissible scope a scope of a specific distance on an object reading line on the basis of a probable edge point detected on a reading line separated from the object reading line by a specific number of reading lines, and recognizes said probable edge point as a document edge point when said probable edge point on the object reading line is present in said permissible scope.

6. The image reading apparatus of claim 1 wherein in a reading line where any document edge point is not recognized, said contour correction means recognizes a specific pixel belonging to said reading line as a document edge point on the basis of document edge points recognized on other reading lines.

7. The image reading apparatus of claim 1 wherein said contour correction means acquires positional information on said probable edge points by scanning image data in one or a plurality of directions, said image data outputted from said image sensor, and recognizes said document edge points on the basis of positional information acquired by scanning in one direction or in different directions.

8. The image reading apparatus of claim 7 wherein when any probable edge point is not detected on a specific number of consecutive reading lines counted from the object reading line in a specific direction where a probable edge point is detected, said contour correction means scans the image data in an opposite direction, said image data outputted from said image sensor.

9. The image reading apparatus of claim 1 which comprises thinning out means for recognizing a representative value on the basis of positional information on said probable edge points detected on one or a plurality of reading lines and contour correction means for recognizing the document edge points on the basis of said representative value.

10. The image reading apparatus of claim 9 wherein said representative value is a middle point between two probable edge points.

11. The image reading apparatus of claim 1, further comprising:

signal generating means for generating effective width signals indicating a document contour on the basis of said document edge points and image forming means for generating an image within the document contour on the basis of image data outputted from said image sensor and said effective width signals.

12. The image reading apparatus of claim 1, further comprising output substitution means for detecting the outside of a document contour of the image data outputted from said image sensor on the basis of said document edge points, substituting the image data outside said document contour with a white image and outputting the data.

13. The image reading apparatus of claim 1, further comprising image data substituting means for detecting the outside of a document contour of the image data on the basis of said document edge points, said image data stored in an image memory for storing said image data outputted from said image sensor, and substituting the image data outside said document contour with a white image.

14. The image reading apparatus of claim 1, further comprising document image reading means for detecting a document contour of the image data on the basis of said document edge points, said image data stored in an image memory, and outputting the image data within said detected document image contour only.

15. The image reading apparatus of claim 1, further comprising closing and opening detection means for detecting a document cover to prevent light from reaching said image sensor from outside and the opening and closing of said document cover and, in case the document cover is opened, actuates said contour detecting means.

16. An image reading apparatus for processing, for each reading line, image data outputted from an image sensor, said apparatus comprising:

contour detecting means for detecting, for each object reading line, a pixel with the quantity of change in density higher than a threshold value as a probable edge point thought to be a document edge point, and contour correction means for determining whether the probable edge point is a document edge point indicating the position of a document edge on the basis of the position of said probable edge point, said contour correction means recognizing the probable edge point as the document edge point, upon determining the probable edge point to be the document edge point, wherein said contour detecting means is provided with density change calculating means for working out the quantity of change in density on the basis of the image density of pixels around an object pixel, and said contour detecting means is further provided with judgement means for detecting the object pixel as said probable edge point if the values of the respective pixels are identical when the densities of a specific number of consecutive pixels either in the direction of scanning or opposite direction of scanning are binarized on a specific slice level, wherein when each reading line is scanned in a specific direction and the density values of a specific number of consecutive pixels in the opposite direction of scanning from said probable edge point are binarized on a specific slice level, said judgement means recognizes said probable edge point to which the values of the respective pixels are identical and judges as a first probable edge point the probable edge point first recognized out of recognized probable edge points, and when each reading line is scanned in a specific direction and the density values of a specific number of consecutive pixels in the direction of scanning from said probable edge point are binarized on a specific slice level, said judgement means recognizes said probable edge point to which the values for the respective pixels are identical and judges as a second probable edge point the probable edge point first recognized out of recognized probable edge points.

17. An image reading apparatus for processing, for each reading line, image data outputted from an image sensor, said apparatus comprising:

contour detecting means for detecting, for each object reading line, a pixel with the quantity of change in density higher than a threshold value as a probable edge point thought to be a document edge point, and contour correction means for determining whether the probable edge point is a document edge point indicating the position of a document edge on the basis of the position of said probable edge point, said contour correction means recognizing the probable edge point as the document edge point, upon determining the probable edge point to be the document edge point, wherein said contour detecting means is provided with density change calculating means for working out the quantity of change in density on the basis of the image density of pixels around an object pixel, and said contour detecting means is further provided with judgement means for detecting the object pixel as said probable edge point if the values of the respective pixels are identical when the densities of a specific number of consecutive pixels either in the direction of scanning or opposite direction of scanning are binarized on a specific slice level, wherein when the densities of a specific number of consecutive pixels either in the scanning direction or the opposite direction of scanning from the object pixel are binarized on a specific slice level in an object image of which the density change quantity is regarded by said density change calculating means as less than said threshold value and not lower than a second threshold value which is less than said threshold value and in case the values of the respective pixels after binarization are identical, said judgement means detects said pixels as tentative probable edge points.

18. The image reading apparatus of claim 17 wherein, when each reading line is scanned in a specific direction and the density values of a specific number of consecutive pixels in the opposite direction of scanning from each tentative probable edge point are binarized on a specific slice level, said judgement means perceives said tentative probable edge point to which the values of the respective pixels after binarization are identical and judges as a first tentative probable edge point the tentative probable edge point first recognized out of said recognized tentative probable edge points, and when each reading line is scanned in a specific direction and the density values of a specific number of consecutive pixels in the direction of scanning from each tentative probable edge point are binarized on a specific slice level, said judgement means perceives said tentative probable edge point to which the values of the respective pixels after binarization are identical and judges as a second tentative probable edge point the probable edge point last perceived out of said tentative perceived probable edge points, and at the same time, when said second tentative probable edge point is not detected on the reading line to which said first tentative probable edge point belongs, said judgement means regards said first tentative probable edge point as a first probable edge point, and when said first tentative probable edge point is not detected on the reading line to which said second tentative probable edge point belongs, said judgement means regards said second tentative probable edge point as a second probable edge point.

19. An image reading apparatus for processing, for each reading line, image data outputted from an image sensor, said apparatus comprising:

contour detecting means for detecting, for each object reading line, a pixel with the quantity of change in density higher than a threshold value as a probable edge point thought to be a document edge point, and contour correction means for determining whether the probable edge point is a document edge point indicating the position of a document edge on the basis of the position of said probable edge point, said contour correction means recognizing the probable edge point as the document edge point, upon determining the probable edge point to be the document edge point, wherein said contour correction means works out the gradients of a first permissible scope-setting straight line passing through an object probable edge point out of permissible scope-setting straight lines passing through two probable edge points separated from each other by a specific number of reading lines, a second permissible scope-setting straight line passing through said probable edge point detected on a second reading line separated from the reading line to which said object probable edge point belongs, by one or a plurality of reading lines, and a third permissible scope-setting straight line passing through said probable edge point detected on a third reading line separated from the reading line to which said object probable edge point belongs, by one or a plurality of reading lines, determines a permissible scope on the basis of a gradient difference value between the second permissible scope-setting straight line and the first permissible scope-setting straight line and a gradient difference value between the third permissible scope-setting straight line and the second permissible scope-setting straight line, and in case the object probable edge point is present in the permissible scope, recognizes said object probable edge point as said document edge point.

20. An image reading apparatus for processing, for each reading line, image data outputted from an image sensor, said apparatus comprising:

contour detecting means for detecting, for each object reading line, a pixel with the quantity of change in density higher than a threshold value as a probable edge point thought to be a document edge point, and contour correction means for determining whether the probable edge point is a document edge point indicating the position of a document edge on the basis of the position of said probable edge point, said contour correction means recognizing the probable edge point as the document edge point, upon determining the probable edge point to be the document edge point, wherein in a reading line where said document edge point is not recognized, said contour correction means recognizes a specific pixel belonging to said reading line as said document edge point on the basis of document edge points recognized on other reading lines, wherein said contour correction means recognizes as said document edge point a pixel located at the intersection point of a straight line passing through a document edge point recognized on one or a plurality of reading lines except for an object reading line and the object reading line.

21. An image reading apparatus for processing, for each reading line, image data outputted from an image sensor, said apparatus comprising:

contour detecting means for detecting, for each object reading line, a pixel with the quantity of change in density higher than a threshold value as a probable edge point thought to be a document edge point, and contour correction means for determining whether the probable edge point is a document edge point indicating the position of a document edge on the basis of the position of said probable edge point, said contour correction means recognizing the probable edge point as the document edge point, upon determining the probable edge point to be the document edge point, wherein said contour correction means acquires positional information on said probable edge point by scanning image data in one or a plurality of directions, said image data outputted from said image sensor, and recognizes said document edge point on the basis of positional information acquired by scanning in one direction or in different directions, and when said probable edge point is not detected on a specific number of consecutive reading lines counted from the object reading line in a specific direction where said probable edge point is detected, said contour correction means scans the image data in an opposite direction, said image data outputted from said image sensor, and said contour correction means recognizes as said document edge point a pixel located at the intersection point between the object reading line and a straight line passing through one or a plurality of said document edge points recognized by scanning in a specific direction or a straight line passing through one or a plurality of said document edge points recognized by scanning in the other direction.

22. A processing apparatus for processing image data, comprising:

contour detecting means for detecting pixels as probable edge points thought to document edge points and an edge point of a projecting area where a light source outside the processing apparatus is projected, said pixels having a higher quantity of change in density than a threshold value, and contour correction means for determining whether each probable edge point is the edge point of the projecting area or not, on the basis of the position of said probable edge points, said contour correction means recognizing the probable edge points except the edge point of the projecting area as the document edge points.

23. An image reading apparatus for processing image data outputted from an image sensor, said apparatus comprising:

contour detecting means for detecting a pixel with the quantity of change in density higher than a threshold value as a probable edge point thought to be a document edge point, and contour correction means for recognizing the document edge point indicating the position of a document edge on the basis of the position of said probable edge point, wherein said contour detecting means is provided with judgement means for detecting an object pixel as said probable edge point if the values of the respective pixels are identical when the densities of a specific number of consecutive pixels either in the direction of scanning or opposite direction of scanning are binarized on a specific slice level, when each reading line is scanned in a specific direction and the density values of a specific number of consecutive pixels in the opposite direction of scanning from said probable edge point are binarized on a specific slice level, said judgement means recognizes said probable edge point to which the values of the respective pixels are identical and judges as a first probable edge point the probable edge point first recognized out of recognized probable edge points, and wherein when each reading line is scanned in a specific direction and the density values of a specific number of consecutive pixels in the direction of scanning from said probable edge point are binarized on a specific slice level, said judgement means recognizes said probable edge point to which the values for the respective pixels are identical and judges as a second probable edge point the probable edge point first recognized out of recognized probable edge points.

24. An image reading apparatus for processing image data outputted from an image sensor, said apparatus comprising:

contour detecting means for detecting a pixel with the quantity of change in density higher than a threshold value as a probable edge point thought to be a document edge point, and contour correction means for recognizing the document edge point indicating the position of a document edge on the basis of the position of said probable edge point, wherein said contour detecting means is provided with judgement means for detecting an object pixel as said probable edge point if the values of the respective pixels are identical when the densities of a specific number of consecutive pixels either in the direction of scanning or opposite direction of scanning are binarized on a specific slice level, and when the densities of a specific number of consecutive pixels either in the scanning direction or the opposite direction of scanning from the object pixel are binarized on a specific slice level in an object image of which the density change quantity is regarded by said density change calculating means as less than said threshold value and not lower than a second threshold value which is less than said threshold value and in case the values of the respective pixels after binarization are identical, said judgement means detects said pixels as tentative probable edge points.

* * * * *

UNITED STATES PATENT AND TRADEMARK OFFICE
CERTIFICATE OF CORRECTION

| | | |
|---|---|---|
| PATENT NO. | : 7,102,786 B2 | |
| APPLICATION NO. | : 09/970084 | |
| DATED | : September 5, 2006 | |
| INVENTOR(S) | : Naoki Takahashi et al. | |

It is certified that error appears in the above-identified patent and that said Letters Patent is hereby corrected as shown below:

Column 21, line 43, change "edge points thought to document edge points and an" to -- edge points thought to be document edge points and an --

Signed and Sealed this

Tenth Day of April, 2007

JON W. DUDAS
*Director of the United States Patent and Trademark Office*